US010175882B2

(12) United States Patent
Labbé et al.

(10) Patent No.: US 10,175,882 B2
(45) Date of Patent: Jan. 8, 2019

(54) DYNAMIC CALIBRATING OF A TOUCH-SCREEN-IMPLEMENTED VIRTUAL BRAILLE KEYBOARD

(71) Applicant: TECHNOLOGIES HUMANWARE INC., Drummondville (Québec) (CA)

(72) Inventors: Dominic R. Labbé, McMasterville (CA); Grégory Saint-Jean, St-Hubert (CA); Gregory Stilson, Madison, WI (US); Maryse Legault, Longueuil (CA); Maude Giasson, Longueuil (CA)

(73) Assignee: Technologies Humanware Inc., Drummondville (Quebec) (CA)

( * ) Notice: Subject to any disclaimer, the term of this patent is extended or adjusted under 35 U.S.C. 154(b) by 248 days.

(21) Appl. No.: 14/753,846

(22) Filed: Jun. 29, 2015

(65) Prior Publication Data

US 2016/0034180 A1    Feb. 4, 2016

Related U.S. Application Data

(60) Provisional application No. 62/031,429, filed on Jul. 31, 2014.

(51) Int. Cl.
*G06F 3/01* (2006.01)
*G06F 3/02* (2006.01)
(Continued)

(52) U.S. Cl.
CPC .......... *G06F 3/04886* (2013.01); *G06F 3/016* (2013.01); *G06F 3/0219* (2013.01);
(Continued)

(58) Field of Classification Search
None
See application file for complete search history.

(56) References Cited

U.S. PATENT DOCUMENTS

| 5,293,464 A | 3/1994 | Hirano et al. |
| 5,412,189 A | 5/1995 | Cragun |

(Continued)

FOREIGN PATENT DOCUMENTS

| WO | 2012040365 A1 | 3/2012 |
| WO | 2012045844 A1 | 4/2012 |

(Continued)

OTHER PUBLICATIONS

Myers, Andrew, Stanford summer course yields touchscreen Braille writer, Stanford Report, Oct. 7, 2011.

(Continued)

*Primary Examiner* — Matthew Yeung
(74) *Attorney, Agent, or Firm* — Hovey Williams LLP

(57) ABSTRACT

A computer-implemented method for dynamically calibrating a virtual Braille keyboard implemented on a touch screen is provided. The virtual Braille keyboard includes a plurality of virtual keys each associated with a corresponding finger of a user and with a variable key location on the touch screen. The method includes detecting typing events, each involving one or more of the fingers of the user contacting the touch screen at corresponding touch locations and defining one or more active fingers for the typing event. The method also includes updating, in real-time, the variable key location of the virtual key associated with each active finger in view of the corresponding touch location detected during a current one of the typing events. A computer-implemented method for reinitializing a calibration of a virtual Braille keyboard for a single one of the two hands of a user is also provided.

15 Claims, 15 Drawing Sheets

(51) Int. Cl.
*G09B 21/00* (2006.01)
*G06F 3/0484* (2013.01)
*G06F 3/0488* (2013.01)

(52) U.S. Cl.
CPC ......... *G06F 3/0484* (2013.01); *G09B 21/003* (2013.01); *G06F 2203/04808* (2013.01)

(56) References Cited

U.S. PATENT DOCUMENTS

| | | | |
|---|---|---|---|
| 5,714,978 A * | 2/1998 | Yamanaka | G06F 3/016 345/157 |
| 6,128,671 A | 10/2000 | Weijand | |
| 6,163,280 A | 12/2000 | Breider | |
| 6,255,938 B1 | 7/2001 | Bornschein | |
| 6,351,726 B1 | 2/2002 | Wong | |
| 6,542,623 B1 | 4/2003 | Kahn | |
| 6,636,202 B2 | 10/2003 | Ishmael, Jr. et al. | |
| 6,712,613 B2 | 3/2004 | Depta | |
| 6,827,512 B1 | 12/2004 | Souluer | |
| 6,961,048 B2 | 11/2005 | Mitchell | |
| 6,987,467 B2 | 1/2006 | Romeo et al. | |
| 7,020,840 B2 | 3/2006 | Sharp | |
| 7,029,190 B1 | 4/2006 | Davis et al. | |
| 7,106,220 B2 | 9/2006 | Gourgey et al. | |
| 7,184,032 B2 | 2/2007 | Stohrer et al. | |
| 7,234,882 B2 | 6/2007 | Takada et al. | |
| 7,318,195 B2 | 1/2008 | Donahue | |
| 7,407,335 B2 | 8/2008 | Damery et al. | |
| 7,432,912 B2 | 10/2008 | Cote et al. | |
| 7,952,564 B2 | 5/2011 | Hurst et al. | |
| 7,985,913 B2 | 7/2011 | Machell | |
| 8,077,021 B2 | 12/2011 | Eldering | |
| 8,085,253 B2 | 12/2011 | Oveisi | |
| 8,217,787 B2 | 7/2012 | Miller, IV | |
| 8,217,901 B2 | 7/2012 | Mulcahy et al. | |
| 8,358,204 B2 | 1/2013 | Eldering | |
| 8,382,480 B2 | 2/2013 | Bucchieri | |
| 8,388,346 B2 | 3/2013 | Rantala et al. | |
| 8,411,058 B2 | 4/2013 | Wong et al. | |
| 8,451,240 B2 | 5/2013 | Pasquero et al. | |
| 8,633,907 B2 | 1/2014 | Mahalingam | |
| 9,489,086 B1 * | 11/2016 | Marsden | G06F 3/04886 |
| 2005/0079472 A1 | 4/2005 | Shimamura et al. | |
| 2006/0280294 A1 | 12/2006 | Zhang | |
| 2007/0222758 A1 | 9/2007 | Mulcahy et al. | |
| 2007/0254268 A1 | 11/2007 | Adachi et al. | |
| 2009/0146957 A1 * | 6/2009 | Lee | G06F 3/04886 345/168 |
| 2009/0220923 A1 | 9/2009 | Smith et al. | |
| 2010/0052950 A1 | 3/2010 | Collier | |
| 2011/0014983 A1 | 1/2011 | Miller, IV | |
| 2011/0020771 A1 | 1/2011 | Rea et al. | |
| 2011/0111375 A1 | 5/2011 | Luu et al. | |
| 2011/0143321 A1 | 6/2011 | Tran et al. | |
| 2011/0216006 A1 | 9/2011 | Litschel | |
| 2011/0304546 A1 | 12/2011 | Rea | |
| 2012/0070805 A1 | 3/2012 | Wong et al. | |
| 2012/0075192 A1 * | 3/2012 | Marsden | G06F 3/04886 345/168 |
| 2012/0154313 A1 * | 6/2012 | Au | G06F 3/04883 345/173 |
| 2012/0218193 A1 | 8/2012 | Weber et al. | |
| 2012/0268389 A1 | 10/2012 | Yaron et al. | |
| 2012/0299853 A1 | 11/2012 | Dagar | |
| 2012/0306633 A1 | 12/2012 | Heron et al. | |
| 2012/0315606 A1 | 12/2012 | Jwa | |
| 2013/0044100 A1 | 2/2013 | King | |
| 2013/0157230 A1 | 6/2013 | Morgan | |
| 2013/0222247 A1 * | 8/2013 | Liu | G06F 3/0418 345/168 |
| 2013/0249821 A1 | 9/2013 | Dharmaraja et al. | |
| 2013/0275907 A1 * | 10/2013 | Lau | G06F 3/04886 715/773 |
| 2013/0321302 A1 | 12/2013 | Naccache et al. | |
| 2014/0009405 A1 | 1/2014 | Wissgott et al. | |
| 2014/0022162 A1 | 1/2014 | Yu et al. | |
| 2014/0168083 A1 | 6/2014 | Ellard | |
| 2015/0363015 A1 * | 12/2015 | Jagtman | G06F 3/041 345/173 |

FOREIGN PATENT DOCUMENTS

| | | |
|---|---|---|
| WO | 2012134210 A2 | 10/2012 |
| WO | 2013169279 A1 | 11/2013 |

OTHER PUBLICATIONS

Bonnington, Christina, Touchscreen Braille writer lets the blind type on a tablet, Wired, 2011, http://www.wired.com/gadgetlab/2011/10/touchscreen-braille-writer/.

Username: Georgia Tech, BrailleTouch helps visually impaired users, Feb. 15, 2012, http://www.youtube.com/watch?v=rIEO1bUFHsl.

Username: Harish Kothendaraman, Braille Touch Tablet, Oct. 10, 2011, http://www.youtube.com/watch?v=vUhR6VFl3i8.

Username: Stanford, Stanford course yields touchscreen Braille Writer, Oct. 6, 2011, http://www.youtube.com/watch?v=ABfCXJSjAq0.

Username: Radisbruder, Braille dynamic virtual keyboard, Nov. 9, 2010, http://www.youtube.com/watch?v=jQMlCveLzW0.

Username: Shiri Azenkot, Perkinput: Eyes-free text entry on Smartphones and Tablets, Jul. 19, 2012, http://www.youtube.com/watch?v=Ot8_lObS1Lc.

Username: Onlygeek, Braille type by Ankit Daftery, Exclusive preview (Beta), Oct. 17, 2011, http://www.youtube.com/watch?v=wQE870a_S3k.

Username: Gan, BrailleKeyboard; Help using Android Smartphone program for the visually impaired, Mar. 14, 2013, http://www.youtube.com/watch?v=P1uykVMJ-oc.

Username: UpSense1, Inpris keyboard (UpSense) tutorial, Jul. 22, 2012, http://www.youtube.com/watch?feature=player_embedded&v=5_DGY2-oxbw#.

Username: Arnanto Akbar, Sparkins—Touch based solution like Perkins Brailler, Jun. 23, 2011, https://www.youtube.com/watch?v=xoBbtf_dWL4.

* cited by examiner

DYNAMIC CALIBRATING OF A TOUCH-SCREEN-IMPLEMENTED VIRTUAL BRAILLE KEYBOARD

RELATED PATENT APPLICATION

This patent application incorporates by reference, in its entirety, and claims priority to U.S. Provisional Patent Application No. 62/031,429 filed Jul. 31, 2014.

TECHNICAL FIELD

The technical field generally relates to methods and systems for touch-screen-implemented virtual keyboards, and more particularly, to methods of dynamically calibrating and reinitializing a calibration of a virtual keyboard, including a virtual Braille keyboard suitable for use by blind and visually impaired individuals.

BACKGROUND

Braille is used by blind and visually impaired individuals as a means of reading and writing text, and a wide range of devices and systems are available for these purposes. These include Braille writers and readers for use either as stand-alone units or in communication with other electronic devices such as, for example, personal computers, tablet computers, smartphones, personal digital assistants, and the like.

Over the last decade, many blind and visually impaired individuals have started using portable Braille devices, also known as notetakers, which include input and output interfaces for respectively entering and displaying Braille content. The input interface is typically embodied by a Perkins-style Braille keyboard. The output interface is often a refreshable Braille display consisting of one or several rows of Braille cells located adjacent the Braille keyboard. Each cell typically includes a plurality of electromechanically controlled pins or dots which can be selectively moved up and down to enable tactile Braille reading. In addition to being useful for typing and displaying Braille content, some notetakers can function as portable computers with software intelligence and processing capabilities that allow performing many functions such as, for example, e-mail and Internet access, data storage, book reading, calendar and contact information management, and connectivity to peripheral devices such as personal computers, tablet computers, smartphones, cellular phones, keyboards, monitors, printers, embossers, hard and flash drives, a camera, and the like.

Due to the widespread use of tablet computers and smartphones in recent years, Braille notetakers have faced intense competition from these lightweight, versatile and ergonomically designed mobile devices. For instance, many of these devices now offer Braille mobile applications targeting the communication needs of blind and visually impaired individuals, including software-generated virtual keyboards having Perkins-style Braille keyboard layout for implementation on a touch screen. Such virtual Braille keyboard implementations need to be calibrated to be operated efficiently.

However, a touch screen is generally not provided with tactile references for enabling a user to assess the location of the keys on a virtual keyboard implemented on the touch screen. As such, it is often unavoidable for a user's fingers to inadvertently drift off the key locations over time during typing. Visually impaired users, however, may not be aware of such a drift as they cannot simply look down at the virtual keyboard to ensure that each of their fingers is adequately positioned with respect to the associated virtual key. Additionally, touch screens adapted for Braille typing may not always be provided with a visual display. In some scenarios, a user could also wish to voluntary change the positions of a number of his or her fingers on the touch screen while typing, but without having to expressly perform a full recalibration of the virtual Braille keyboard. Accordingly, various challenges still exist in the implementation and calibration of virtual Braille keyboards.

SUMMARY

According to an aspect, there is provided a computer-implemented method for dynamically calibrating a virtual Braille keyboard implemented on a touch screen, the virtual Braille keyboard including a plurality of virtual keys each associated with a corresponding one of the fingers of a user and with a variable key location on the touch screen. The method includes the steps of:
  (a) detecting a plurality of typing events, each involving one or more of the fingers of the user contacting the touch screen at corresponding touch locations and defining one or more active fingers for the typing event; and
  (b) updating, in real-time, the variable key location of the virtual key associated with each active finger in view of the corresponding touch location detected during a current one of the typing events.

According to another aspect, there is provided a computer readable memory storing computer executable instructions thereon that when executed by a computer perform the dynamic calibration method steps as described above.

According to another aspect, there is provided a Braille device including:
  a housing;
  a touch screen disposed on the housing and having a virtual Braille keyboard implemented thereon and configured for entry of input Braille data from a user, the virtual Braille keyboard including a plurality of virtual keys each associated with a corresponding one of the fingers of the user and with a variable key location on the touch screen; and
  a calibration module for dynamically calibrating the virtual Braille keyboard while receiving the input Braille data from the user, the calibration module being configured to:
    detect a plurality of typing events, each involving one or more of the fingers of the user contacting the touch screen at corresponding touch locations and defining one or more active fingers for the typing event; and
    update, in real-time, the variable key location of the virtual key associated with each active finger in view of the corresponding touch location detected during a current one of the typing events.

According to another aspect, there is provided a computer-implemented method for reinitializing a calibration of a virtual Braille keyboard for a single one of the two hands of a user, the virtual Braille keyboard being implemented on a touch screen and including a plurality of virtual keys each associated with a corresponding one of the fingers of the user and with a key location on the touch screen. The method includes the steps of:
  (a) detecting a plurality of typing events, each involving one or more of the fingers of the user contacting the touch screen at corresponding ones of the key locations;

(b) detecting a reinitialization-triggering event performed by one or more of the fingers of the one of the hands of the user;

(c) detecting touch locations on the touch screen of the fingers of the one of the hands of the user; and (d) reinitializing the key locations of the virtual keys associated with the fingers of the one of the hands of the user using the corresponding touch locations detected at step (c), while keeping unchanged the key locations of the virtual keys associated with the fingers of the other one of the hands of the user.

According to another aspect of the invention, there is provided a computer readable memory storing computer executable instructions thereon that when executed by a computer perform the calibration reinitialization method steps as described above.

According to another aspect, there is provided a Braille device including:
- a housing;
- a touch screen disposed on the housing and having a virtual Braille keyboard implemented thereon and configured for entry of input Braille data from a user, the virtual Braille keyboard including a plurality of virtual keys each associated with a corresponding one of the fingers of the user and with a key location on the touch screen; and
- a reinitialization module for reinitializing a calibration of the virtual Braille keyboard for a single one of the two hands of the user, the reinitialization module being configured to:
  - detect a plurality of typing events, each involving one or more of the fingers of the user contacting the touch screen at corresponding ones of the key locations;
  - detect a reinitialization-triggering event performed by one or more of the fingers of the one of the hands of the user;
  - detect touch locations on the touch screen of the fingers of the one of the hands of the user; and
  - reinitialize the key locations of the virtual keys associated with the fingers of the one of the hands of the user using the corresponding detected touch locations, while keeping unchanged the key locations of the virtual keys associated with the fingers of the other one of the hands of the user.

In some embodiments, the Braille device can include a Braille display disposed on the housing and configured for tactile reading of output Braille data. The Braille display can be accessible for reading by the one of the hands of the user between the detection of the plurality of typing events and the detection of the reinitialization-triggering event.

Other features and advantages of the embodiments of the present invention will be better understood upon reading of preferred embodiments thereof with reference to the appended drawings.

DETAILED DESCRIPTION

Figure 1:
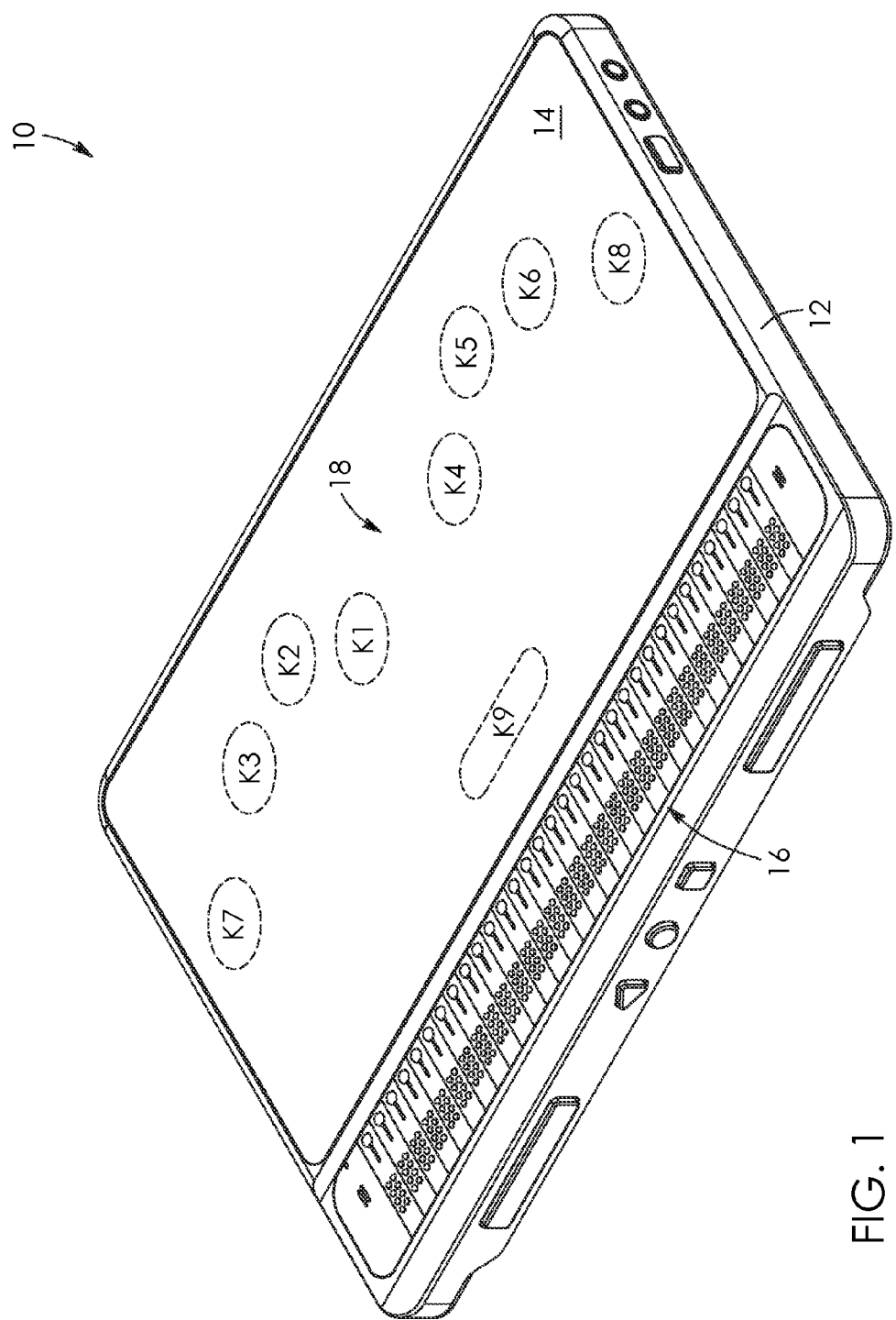
FIG. 1 is a perspective view of a portable Braille device in accordance with an embodiment.

In the following description, similar features in the drawings have been given similar reference numerals, and, in order to not unduly encumber the figures, some elements may not be indicated on some figures if they were already identified in preceding figures. It should also be understood that the elements of the drawings are not necessarily depicted to scale, since emphasis is placed upon clearly illustrating the elements and structures of the present embodiments.

The present description generally relates to a method for dynamically calibrating a virtual Braille keyboard implemented on a touch screen, and to a method for reinitializing a calibration of a virtual Braille keyboard for a single hand of a user. The present description also generally relates to a Braille device capable of performing these methods, as well as to a computer readable memory storing computer executable instructions thereon that when executed by a computer can perform these methods.

As used herein, the term "virtual keyboard" is intended to refer to a software-based representation of a keyboard implemented on a touch screen as a plurality of user-selectable virtual keys. In particular, the term "virtual Braille keyboard" denotes a virtual representation of a Braille keyboard implemented on a touch screen. The virtual Braille keyboard can be configured in a Perkins-style Braille keyboard layout or another form of Braille keyboard layout.

In a virtual keyboard, the virtual keys are each associated with a key location on the touch screen and are configured for tactile data entry by a user. When a user initiates a typing event by contacting the touch screen at the key location of a particular virtual key, hardware and/or software processing resources associated with the virtual keyboard can be used to: (i) detect the typing event; (ii) determine a touch location on the touch screen where the typing event occurred; (iii) identify which particular virtual key is associated with the touch location; and (iv) interpret the typing event as a keystroke of the particular virtual key.

The methods described herein can be performed on a wide range of devices and systems provided with a touch screen capable of implementing a virtual Braille keyboard. Non-limiting examples include tablet computers, smartphones, personal digital assistants, touch-screen-equipped personal computers, interactive kiosks, automated teller machines, and the like, as well as electronic Braille devices targeted more toward blind and visually impaired individuals and intended for use either as stand-alone units or in communication with other equipment. An example of such an electronic Braille device is described below with reference to FIGS. 1 and 2. Another example is provided in U.S. provisional patent application No. 61/951,027, now found in U.S.

nonprovisional patent application Ser. No. 14/643,919, the contents of both applications being incorporated herein by reference in their entirety.

The techniques described herein may be particularly useful in any application where it is desirable or necessary to provide methods and systems for performing dynamic calibration and/or calibration reinitialization of a virtual Braille keyboard implemented on a touch screen for use by individuals suffering from blindness, low vision or other visual impairments. Although the terms "blind individuals", "low-vision individuals" and "print-disabled individuals" are sometimes defined as referring to particular levels of visual acuity, those skilled in the art will understand that the techniques described herein may improve Braille typing on a touch-screen-implemented virtual keyboard irrespectively of the level of visual acuity of the user. In particular, the techniques described herein may be of use to sighted people who do not suffer from any visual impairment but nonetheless wish to use Braille as a communication means.

Embodiment of a Braille Device

Figure 2:
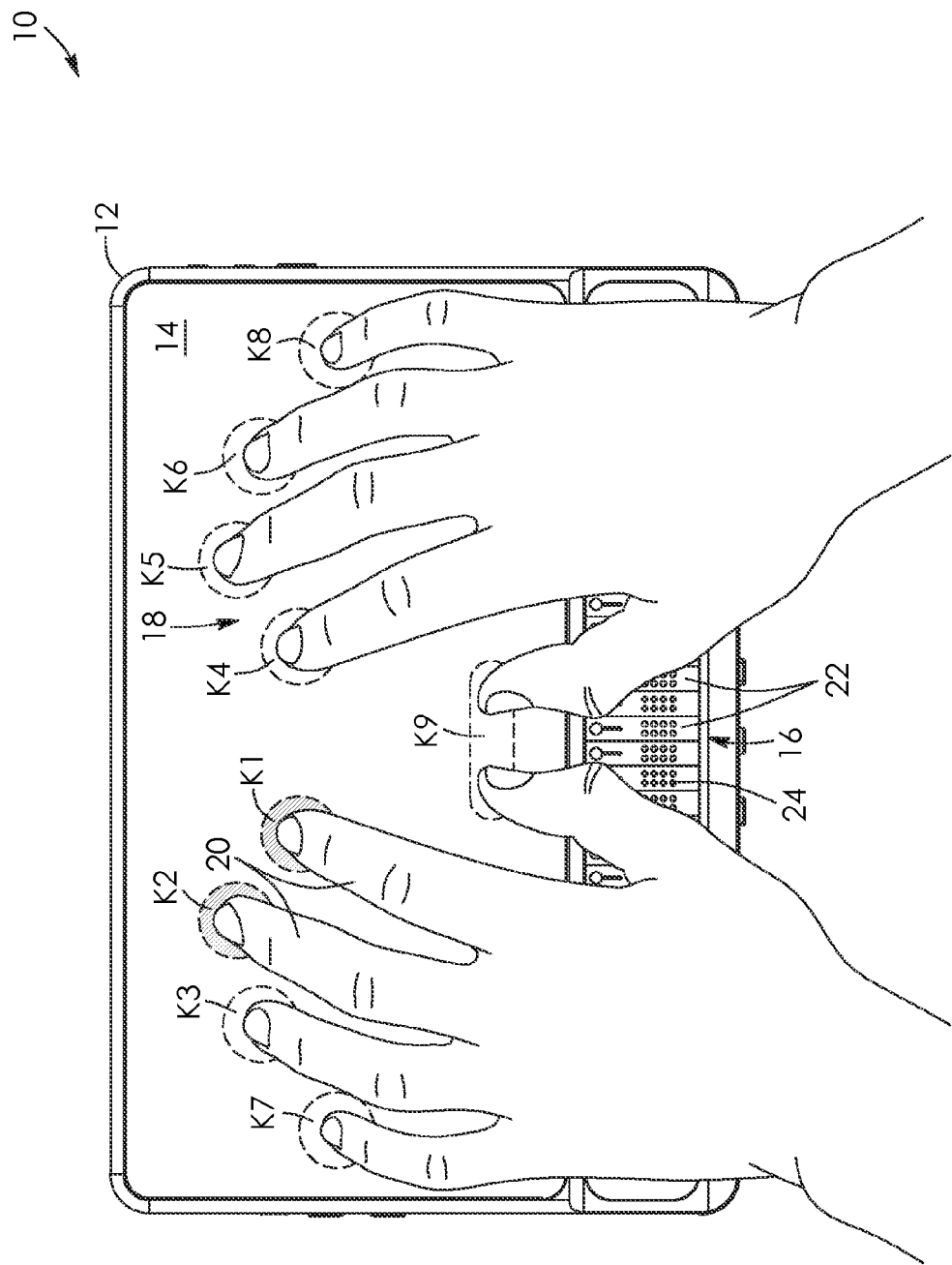
FIG. 2 is a top plan view of the portable Braille device of FIG. 1, wherein the fingers of a user are disposed above the corresponding keys of the virtual Braille keyboard implemented on the touch screen.

Referring to FIGS. 1 and 2, there is illustrated an embodiment of a portable Braille device 10. The portable Braille device 10 includes a housing 12, a touch screen 14, an optional refreshable Braille display 16 provided on the housing 12, and a processing unit (not shown) inside the housing 12. A brief description of these components of the portable Braille device 10 will be provided below.

As used herein, the term "portable" is understood to refer to an electronic Braille device that is both small and light enough to be readily carried by a user. However, while the portable Braille device can be used as stand-alone unit, it may also be connected to and used in combination with stationary equipment. Accordingly, in some embodiments, the portable Braille device may be momentarily, or permanently, connected to one or more peripheral devices such as, for example, a personal computer, a tablet computer, a smartphone, a cellular phone, a printer, a keyboard, a monitor, a printer, a Braille embosser, a hard drive, a camera, and the like.

In this regard, and as mentioned above, it is worth emphasizing that the methods described herein can be performed or implemented not only on devices and systems targeted more toward blind and visually impaired individuals, but also on a wide range of devices and systems that may not be dedicated specifically to blind and visually impaired individuals but that are provided with a touch screen capable of implementing a virtual Braille keyboard. Such devices and systems can include, for example, tablet computers, smartphones, personal digital assistants, touch-screen-equipped personal computers, interactive kiosks, automated teller machines, and the like.

The housing 12 generally defines the overall shape of the portable Braille device 10, and houses, supports and protects its various components. The housing 12 can consist of a thin rectangular shell made of light yet sturdy and durable material, for example molded plastic or lightweight metals and alloys such as, for example, aluminum or allows of magnesium. The housing 12 may have an ergonomic shape to facilitate grasping and holding of the portable Braille device 10. In addition, in some embodiments, the dimensions of the housing 12 can be selected based on a required or desired size for the touch screen 14.

The touch screen 14 is configured to implement a virtual Braille keyboard 18 for entry of input Braille data from a user. The dimensions of the touch screen 14 can be selected to provide a virtual Braille keyboard 18 sufficiently large to ensure a comfortable typing experience for users of most hand sizes. Depending on the requirements and particularities of a given application, the touch screen 14 can be based on different touch-sensing technologies including, but not limited to, capacitive, multi-touch capacitive, resistive, resonant inductive coupling and surface acoustic wave touch-sensing technologies. The implementation of the virtual Braille keyboard 18 on the touch screen 14 allows Braille to be typed via tactile interactions, thereby simulating the operation of physical Braille keyboards without some of their limitations and drawbacks in terms of ergonomics and comfort. In particular, in contrast to physical Braille keyboard whose dimensions and layout cannot readily be adjusted to a user's preferences, the virtual Braille keyboard 18 can be customized to suit a user's fingers and preferred typing position.

In the illustrated embodiment, the virtual Braille keyboard 18 is implemented on the touch screen 14 as a Perkins-style Braille keyboard with eight dot keys K1 to K8 and a spacebar key K9. Each of the virtual keys K1 to K9 is associated with a corresponding one of the fingers 20 of a user and with a key location on the touch screen 14. Of course, other embodiments can implement other forms of Braille keyboard layouts to suit a particular application of the portable Braille device 10. For example, in some embodiments, the virtual Braille keyboard 18 can be implemented as an eight-key Perkins-style Braille keyboard, a six-key Perkins-style Braille keyboard, or any other convenient form of Perkins or non-Perkins Braille keyboard layout.

Entry of a Braille character on the virtual Braille keyboard 18 involves the user placing a number of fingers 20 in contact with the touch screen 14 at the key locations of a corresponding number of the virtual keys K1 to K9. As known in the art, Braille characters can include, without limitation, letters, numbers, punctuations, symbols, indicators, Braille composition signs, and the like. For example, in FIG. 2, the left index and middle fingers of the user contact the touch screen 14 at the key locations of the virtual keys K1 and K2, corresponding to the letter "b" being typed on the virtual Braille keyboard 18.

The locations of the virtual keys K1 to K9 on the touch screen 14 can be determined by performing an initial calibration of the virtual Braille keyboard 18. As used herein, the term "initial calibration" is intended to refer to a process by which the virtual Braille keyboard is initialized through the assignment of a key location on the touch screen to every virtual key of the keyboard. It is to be noted that a calibration that reinitializes or replaces an existing calibration of the virtual Braille keyboard can be referred to as a "recalibration". The virtual Braille keyboard 18 can be initially calibrated, or recalibrated, at the user's request, periodically and/or in response to predetermined events, for example whenever the touch screen is turned on or has been inactive for a certain period of time.

The process of initializing (or reinitializing) the virtual Braille keyboard can include: (i) detecting touch inputs from the user contacting the touch screen at a plurality of touch locations with his or her fingers arranged in a typing position corresponding to the intended layout of the virtual Braille keyboard; and (ii) assigning each one of the detected touch locations as the key location of a corresponding one of the virtual key. It will be understood that such an initial calibration or recalibration procedure is generally performed prior to starting or resuming typing, but not while typing occurs. The procedure also generally involves initializing or reinitializing the entire virtual Braille keyboard at once. As will be described below, the techniques described herein can provide a method for dynamically calibrating a virtual Braille keyboard in real-time during typing, as well as a method for reinitializing a virtual Braille keyboard for one hand of a user while preserving or keeping unchanged an existing calibration for the other hand.

In some embodiments, the portable Braille device may include a visual display under the touch screen to present visual content to the user. The visual display can use liquid crystal display (LCD) or another display technology. Although not directly useful for blind individuals, a visual display can be useful to low-vision, print-disabled or sighted users. For example, teachers of blind students who use the portable Braille device may use the visual display to review the work of their students. In this regard, it should be noted that the virtual keys K1 to K9 are depicted in FIGS. 1 and 2 for clarity of understanding of the operation of the virtual Braille keyboard 18. However, they may not necessarily be shown by the visual display or would not be visible when a visual display is not provided with the portable Braille device 10.

Referring still to FIGS. 1 and 2, in some implementations the portable Braille device 10 can include a refreshable Braille display 16 for tactile reading of output Braille data by the user. As used herein, the term "refreshable" is intended to mean that the Braille display is capable of changing over time, either automatically or controllably, the Braille data that is displayed to the user. In FIGS. 1 and 2, the refreshable Braille display 16 includes a linear array of thirty-two Braille cells 22, but other embodiments could use a different number of cells and/or a different technology (e.g., magnetic or infrared laser radiation) capable of presenting Braille content in a refreshable manner. Each Braille cell 22 can include a plurality of electromechanically actuated pins that can be selectively raised to enable tactile Braille reading by the user. Of course, another Braille cell actuation method (e.g., based on a tactile image screen) could be used in other embodiments. In FIGS. 1 and 2, each cell 22 has eight pins 24 arranged in two columns of four pins, but other configurations are possible such as, for example, six pins arranged in two columns of three pins. The pins 24 of a given cell 22 can be moved up and down in response to an electrical signal to form different combinations of raised dots representing Braille characters. However, it will be readily understood that some embodiments of a Braille device adapted to carry out the methods described herein may not include a Braille display while still being encompassed within the scope of the technique described herein.

As mentioned above, referring to FIG. 7, the portable Braille device 10 further includes a processing unit 28 in the housing. The processing unit 28 can receive input Braille data from the touch screen 14 and transmit output Braille data to the refreshable Braille display 16, if provided. The term "processing unit" denotes herein an entity of the portable Braille device that controls or executes, at least partially, the functions required for operating the portable Braille device, including, without being limited to, inputting Braille data entered through the virtual Braille keyboard implemented on the touch screen.

The processing unit may be implemented as a single unit or a plurality of interconnected processing sub-units. Also, the processing unit may be embodied by a microprocessor, a microcontroller, a central processing unit (CPU), a processing core, a system on a chip (SoC), a digital signal processor (DSP), a programmable logic device, an application processor, or by any other processing resource or any combination of such processing resources configured to operate collectively as a processing unit. Those skilled in the art will recognize that the processing unit can be implemented in hardware, software, firmware, or any combination thereof, and be connected to the various components of the portable Braille device via different input/output (I/O) communication ports.

Figure 7:
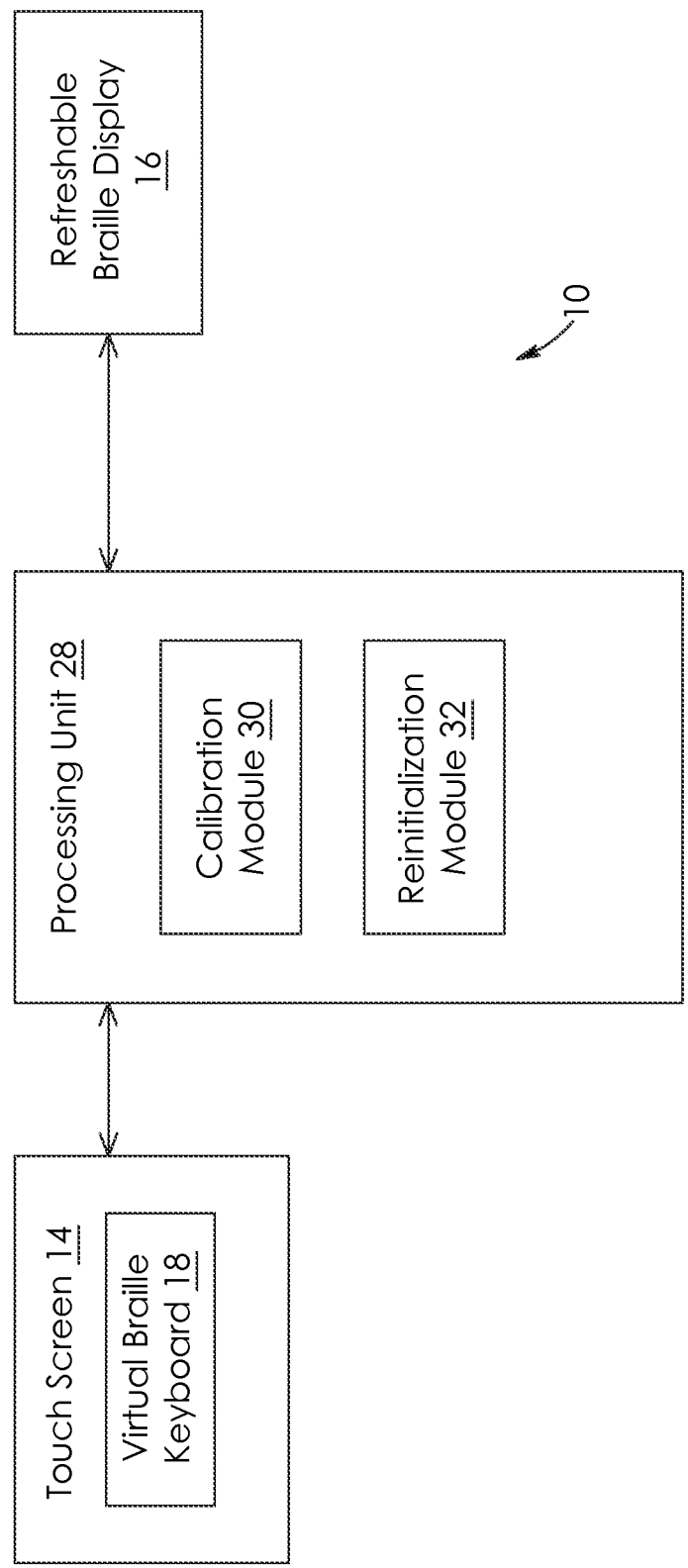
FIG. 7 is a schematic functional block diagram of the portable Braille device of FIG. 1.

The processing unit can be described as a series of various modules, each associated with one or more different functions. For example, in FIG. 7, the processing unit 28 can include a calibration module 30 for dynamically calibrating the virtual Braille keyboard while receiving input Braille data from a user and/or a reinitialization module 32 for reinitializing a calibration of the virtual Braille keyboard for one of the hands of the user. In FIG. 7, the processing unit 28 of the portable Braille device 10 includes both a calibration module 30 and a reinitialization module 32. However, in other embodiments, the processing unit may include only one of the calibration module and the reinitialization module.

It will be understood that, in practice, each module may include a plurality of sub-modules, routines, components, communication ports, software, and the like cooperating together in order to accomplish the corresponding function. Additionally, it will be understood that the subdivision into such modules is made from a conceptual standpoint only and that, in practice, a given hardware or software component may be shared by different modules, and that components of different modules may be combined together physically and logically without departing from the scope of the present invention.

Computer Readable Memory

According to another aspect, there is provided a computer readable memory storing computer executable instructions thereon that when executed by a computer can perform the dynamic calibration and/or calibration reinitialization methods described herein.

As used herein, the term "computer readable memory" is intended to refer to a non-transitory and tangible computer product that can store and communicate executable instructions for the implementation of the dynamic calibration and calibration reinitialization methods described herein. The computer readable memory can be any computer data storage device or assembly of such devices including, for example: a temporary storage unit such as a random-access memory (RAM) or dynamic RAM; a permanent storage such as a hard disk; an optical storage device, such as a CD or DVD (rewritable or write once/read only); a flash memory; and/or other non-transitory memory technologies. A plurality of such storage devices may be provided, as can be understood by those skilled in the art.

According to the technique described herein, the computer readable memory may be associated with, coupled to or included in a processing unit such as described above and configured to execute instructions stored in the computer readable medium in connection with various functions associated with the processing unit. In particular, the processing unit includes electronic circuitry that controls and executes, at least partially, computer instructions required to perform the dynamic calibration and calibration reinitialization methods described herein. A plurality of such processing units may be provided, according to the techniques described herein, as can be understood by those skilled in the art. The processor may be provided within one or more general purpose computers, for example, and/or any other suitable computing devices.

Dynamical Calibration of a Virtual Braille Keyboard

In accordance with another aspect, there is provided a computer-implemented method for dynamically calibrating a virtual Braille keyboard implemented on a touch screen and including a plurality of virtual keys. Each virtual key is associated with a corresponding one of the fingers of a user and with a variable key location on the touch screen.

As used herein, the term "dynamic calibration" refers to a calibration that is performed in real-time while the user is typing on the virtual Braille keyboard. By providing a dynamic calibration of the virtual Braille keyboard, embodiments of the method enable real-time updating of the locations of the virtual keys in view of the contact points on the touch screen actually touched by the user while typing occurs.

The term "real-time" is used herein as a practical term depending upon the requirements of an intended implementation of the dynamic calibration method and generally refers to the fact that the dynamic calibration method can update the key location of the virtual keys of the virtual Braille keyboard with negligible or insignificant time lag during typing. The dynamic calibration method can preferably be performed seamlessly on the typical scale of human perception so as to provide a convenient and smooth typing experience to the user. For example, in a non-limitative embodiment, the dynamic calibration method can update the key location of the virtual keys of the virtual Braille keyboard in less than 20 milliseconds during typing.

It will be understood that because there are generally no tactile references on the touch screen for detecting the location of the keys on the virtual Braille keyboard, it is often unavoidable for a user's fingers to inadvertently drift off the key locations over time during typing. In some scenarios, a user could also wish to voluntary change the positions of a number of his or her fingers on the touch screen while typing, but without the user having to expressly perform a full recalibration of the virtual Braille keyboard. As will be described below, embodiments of the dynamic calibration methods aim to track and compensate for such inadvertent drifts and deliberate changes in the positions on the touch screen of the fingers of the user.

An embodiment of the dynamic calibration method 100 will be described with reference to the flow chart of FIG. 3, in conjunction with the diagrams of FIGS. 4A to 4E. The diagrams of FIGS. 4A to 4E are schematic top plan views of a touch screen 14 implementing a virtual Braille keyboard 18, illustrating different steps of an embodiment of the dynamic calibration method. The dynamic calibration method can, by way of example, be performed with a portable Braille device like that described above with reference to FIGS. 1 and 2, or on any other suitable device provided with a touch screen controlled by modules performing the appropriate functions.

Figure 4A:
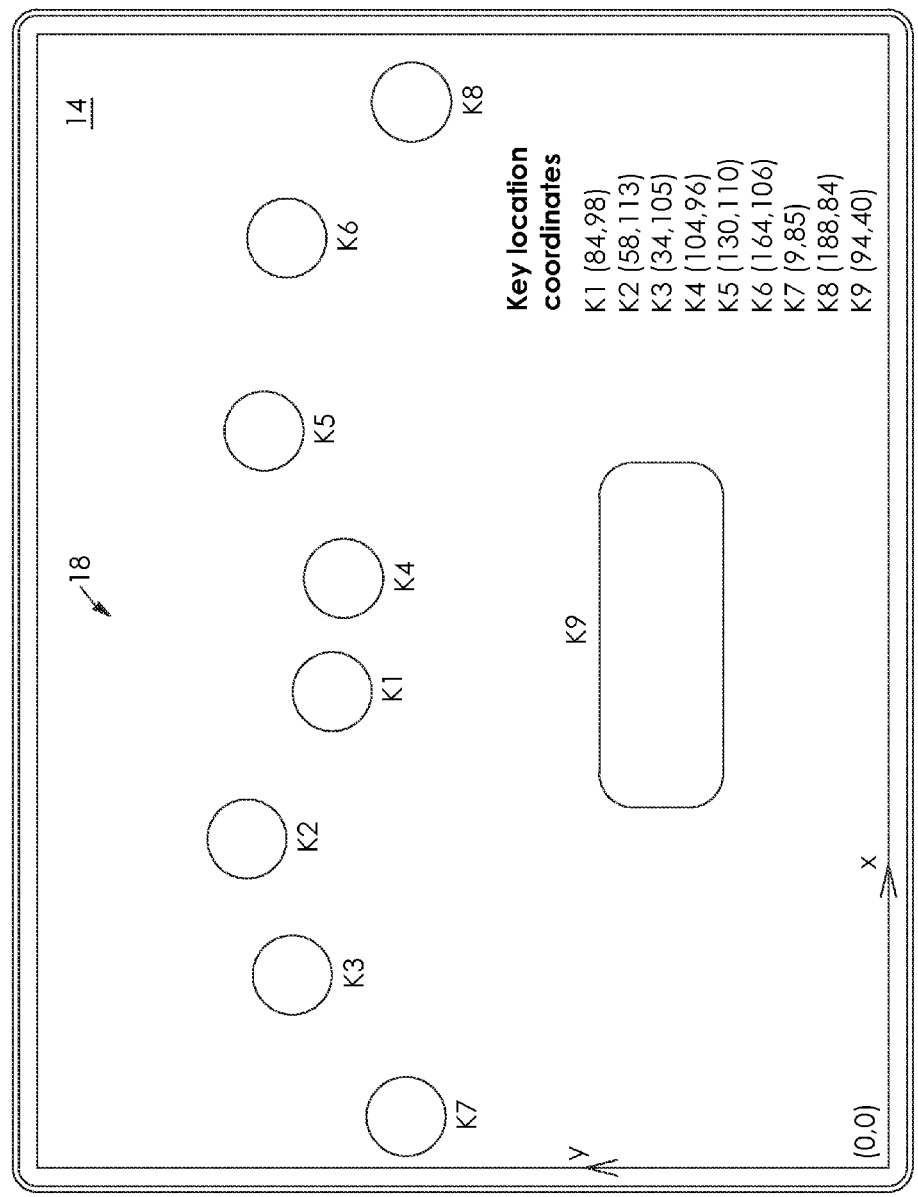
FIGS. 4A to 4E are schematic top plan views of a touch screen implementing a virtual Braille keyboard, illustrating different steps of an embodiment of the dynamic calibration method.

Referring to FIG. 4A, at the start of the method, a current calibration of the virtual Braille keyboard 18 is implemented on the touch screen 14. This current calibration of the virtual Braille keyboard 18 may have been established through an initial calibration or recalibration procedure intentionally performed by the user, or through a previous application of the dynamic calibration method described herein. The first scenario is assumed in FIG. 4A for purposes of illustration.

The virtual Braille keyboard 18 is implemented on the touch screen 14 as a Perkins-style Braille keyboard with eight dot keys K1 to K8 and a spacebar key K9, but other forms of Braille keyboard layouts could be implemented. Each of the virtual keys K1 to K9 is associated with a variable key location on the touch screen 14 and intended for activation by a corresponding one of the fingers of a user. The adjective "variable" in this context is used to emphasize that the location of each virtual key of the virtual Braille keyboard can change as a result of performing the dynamic calibration method described herein.

For convenience, the variable key location of each of the virtual keys K1 to K9 can be identified by its location coordinates x and y with respect to an x-y coordinate system. The x-y coordinate system includes x and y axes orthogonal to each other and respectively parallel to the width and height of the touch screen 14, and its origin coincides with the left bottom corner of the touch screen 14. For example, in the calibration of the virtual Braille keyboard 18 provided in FIG. 4A, the virtual keys K1 to K9 are identified by circular dots centered on the following x-y key location coordinates:

$$K1(84, 98) \quad K4(104, 96) \quad K7(9, 85) \quad (1)$$
$$K2(58, 113) \quad K5(130, 110) \quad K8(188, 84)$$
$$K3(34, 105) \quad K6(164, 106) \quad K9(94, 40).$$

Of course, the origin of the coordinate system may be placed at any convenient location. For example, in other embodiments, the origin of the coordinate system could be located at another corner of the touch screen 14, at the center of the touch screen 14 or at another location on the touch screen 14. Additionally, the mapping of the key locations of the virtual keys K1 to K9 is not limited to a two-dimensional Cartesian x-y coordinate system, but may alternatively use any convenient coordinate system (e.g., a polar coordinate system).

It will be understood that it can be rather easy or sometimes unavoidable for a typist using a virtual Braille keyboard to inadvertently contact the touch screen at a location that is slightly off the key location of the virtual key that was intended for activation. This may be especially true in the case of blind or visually impaired users and/or virtual Braille keyboard not displayed on a visual display. The dynamic calibration method according to the techniques described herein aims to address or mitigate this issue, as will now be described.

Figure 3:
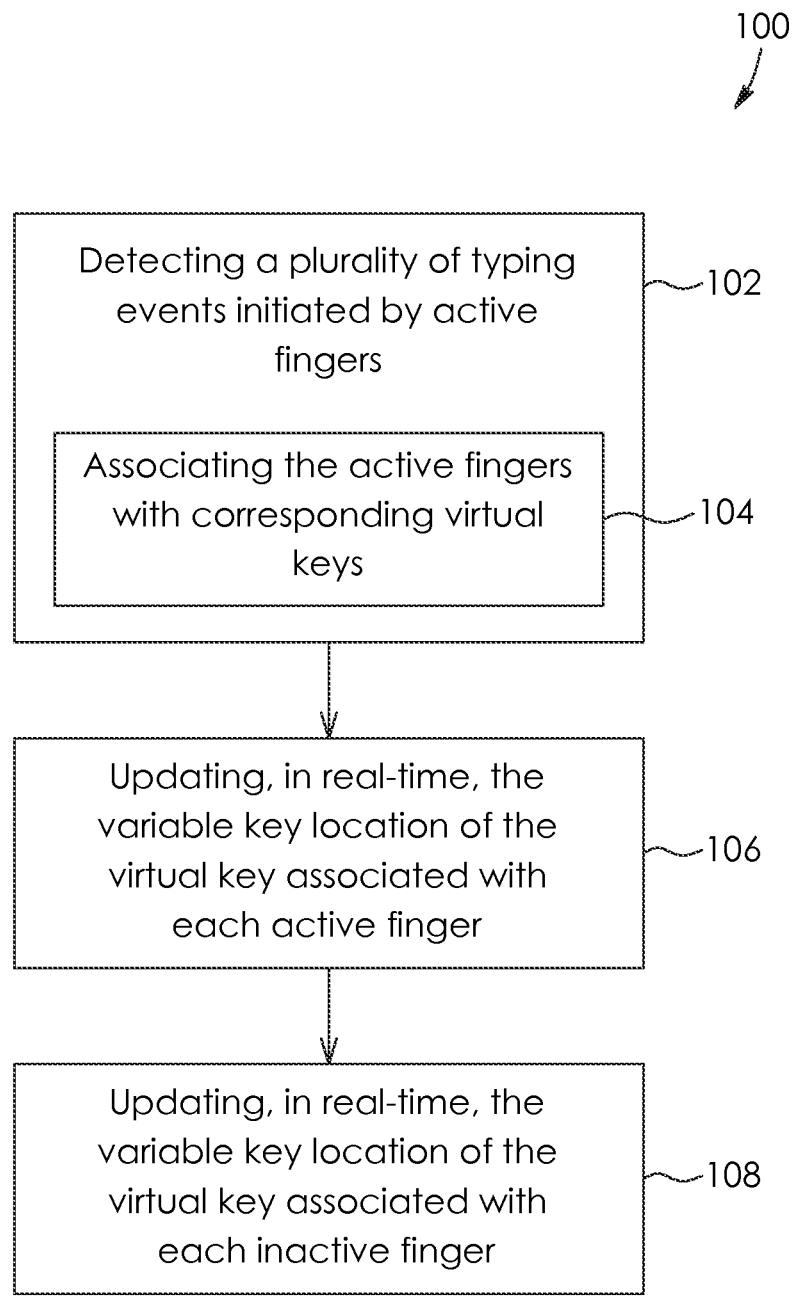
FIG. 3 is flow chart of a method for dynamically calibrating a virtual Braille keyboard, in accordance with an embodiment.

Referring to FIG. 3, the method 100 first includes a step of detecting 102 a plurality of typing events, each typing event involving one or more fingers of the user contacting the touch screen at corresponding touch locations.

As used herein, the term "typing event" is intended to refer to the entry of one Braille character on the virtual Braille keyboard through the coordinated activation of one or more virtual keys by one or more fingers associated therewith. As previously mentioned, a Braille character can include, without limitation, letters, numbers, punctuations, symbols, indicators, Braille composition signs, and the like. Depending on the proficiency level of the Braille typist, as much as 250 to 350 typing events per minute can be initiated and detected.

The one or more fingers involved in a given typing event define one or more "active fingers" for that typing event, while the remainder of the fingers defines one or more "inactive fingers". The fingers of the user that are "active fingers" will thus generally change between successive typing events. For example, for a given typing event, the active fingers can be all from a same hand of the user, while the fingers of the other hand are inactive fingers for that typing event. In another typing event, each hand may include both active and inactive fingers. Other typing events may include only one active finger or only one inactive finger.

In some implementations, each typing event can be detected when contact with the touch screen at the corresponding touch locations is either initiated or terminated by the user. Accordingly, each typing event can involve a number of touch gesture actions being performed by the active fingers including, without being limited to, a single or multiple tapping motion, a press-and-release motion, a sliding motion, a swiping motion, and any combinations thereof. Upon detection of a given typing event, the detection 102 can involve a step of associating 104 each active finger with the virtual key whose variable key location prior to the typing event is closest to the touch location of the active finger.

Figure 4B:
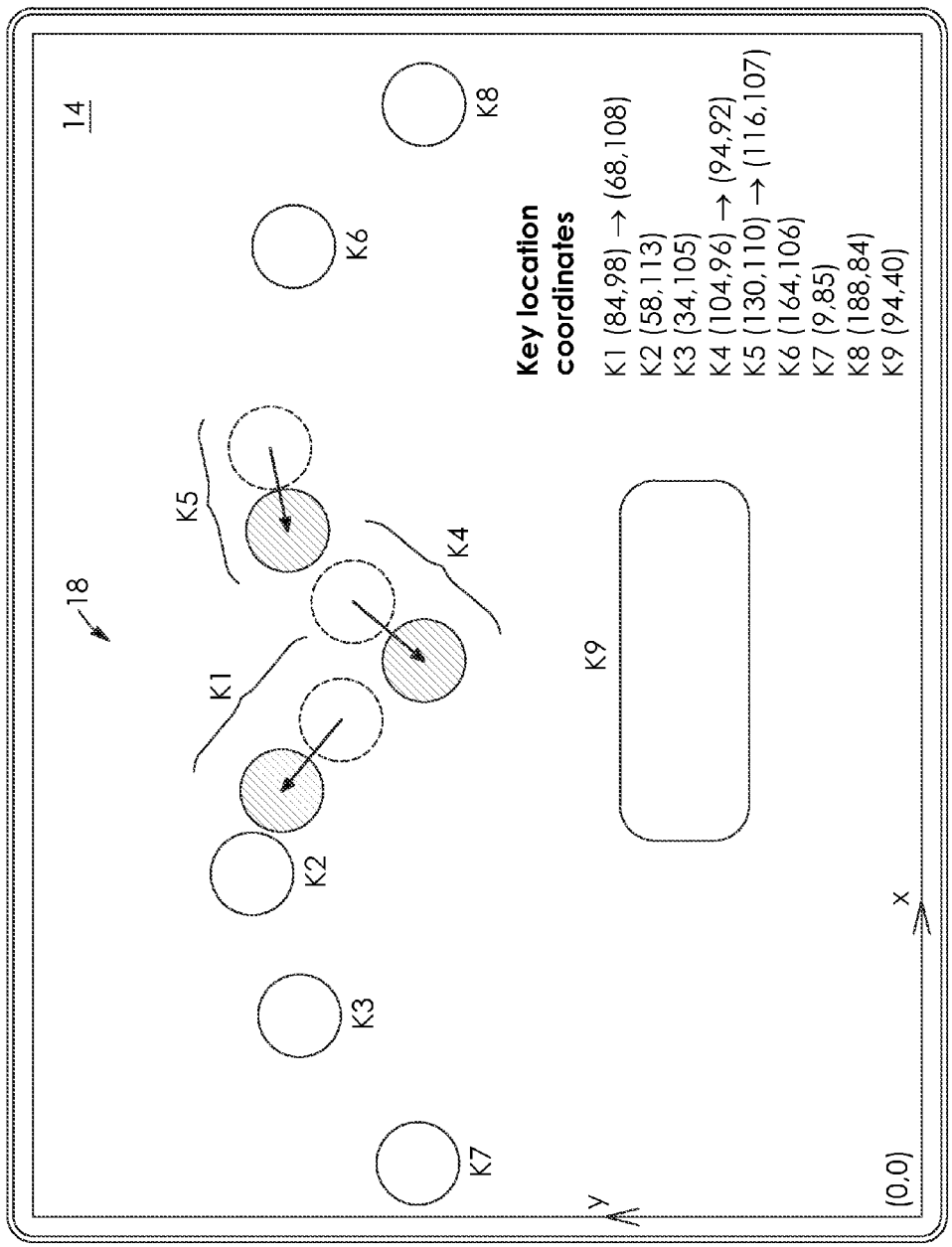

Turning now to FIG. 4B, a first typing event is illustrated. The active fingers involved in this typing event are the index finger of the left hand and the index and middle fingers of the right hand, which contacted the touch screen 14 at the following x-y touch location coordinates:

Left index finger (68, 108) (2)

Right index finger (94, 92)

Right middle finger (116, 107).

The touch locations of the active fingers on the touch screen 14 are indicated by hashed circular dots centered on the touch locations. The remaining fingers of the user's hands are considered inactive fingers for this first typing event.

Once it is assessed that a typing event has occurred that involves the touch screen 14 being contacted at touch locations (68, 108), (94, 92) and (116, 107), each touch location can be associated with the one of the virtual keys K1 to K9 whose key location prior to the typing event is the closest. Accordingly, the touch locations (68, 108), (94, 92) and (116, 107) of the three active fingers can be respectively associated with the virtual keys K1, K4 and K5. As known in the art, the activation of the virtual keys K1, K4 and K5 corresponds to the letter "d" being typed on the virtual Braille keyboard 18.

Referring back to FIG. 3, the method 100 also includes a step of updating 106, in real-time, the variable key location of the virtual key associated with each active finger in view of the corresponding touch location detected during a current one of the typing events. The term "real-time" as used throughout the present description has been defined above. For simplicity, a virtual key associated with an active finger for a given typing event will also be referred to herein as an "activated virtual key".

Returning to FIG. 4B, after the typing event has been detected and interpreted as involving the actuation of the virtual keys K1, K4 and K5, the variable key locations of the virtual keys K1, K4 and K5 can be updated. That is, the variable key locations of the virtual keys K1, K4 and K5 can be changed to the touch locations on the touch screen 14 of the associated active fingers. Specifically, the variable key locations of the virtual keys K1, K4 and K5 are respectively updated from (84, 98), (104, 96) and (130, 110) to (68, 108), (94, 92) and (116, 107), as indicated by arrows on FIG. 4B.

In some embodiments, the dynamic calibration method may impose that in order to update the currently stored key location of the virtual key to the corresponding touch location of the associated active finger, the separation between the two locations should exceed a predetermined threshold. In other words, in some embodiments, the dynamic calibration method described herein can tolerate a small amount of inaccuracy when the user is typing. As a result, in such embodiments, the virtual keys of the Braille keyboard may not have to be displaced to the actual touch locations of the associated active fingers at each and every typing event. Of course, it will be understood that in this particular scenario the locations of the virtual keys may not change following a given typing event. However, because the question of whether or not to change the locations of the virtual keys is assessed, it can still be said that the key locations of the virtual keys are "updated" in view of the corresponding touch locations of the associated active fingers detected during the given typing event.

Referring back to FIG. 3, in some embodiments, the method 100 can further include a step of updating 108, in real-time, the variable key location of the virtual key associated with each inactive finger of a current typing event. For simplicity, a virtual key associated with an inactive finger for a given typing event will also be referred to herein as an "unactivated virtual key". For the typing event depicted in FIG. 4B, the unactivated virtual keys are K2, K3 and K6 to K9.

It is noted that, for simplicity, the treatment of the spacebar virtual key K9 will be omitted below. This is often a legitimate assumption, given that the relative isolation of the virtual key K9 from the other keys can allow it to occupy a larger surface area on the touch screen 14. In turn, this larger surface area generally makes hand drift during typing less likely to be detrimental, thereby possibly, but not necessarily, mitigating the benefits of using the dynamic calibration method with the virtual key K9. However, in some embodiments the spacebar virtual key K9 may also be processed according to the principles of the method described herein. It will also be understood that, in some embodiments, the spacebar key of the virtual Braille keyboard may in fact consist of two distinct virtual keys (e.g., K9 and K10), each having a corresponding key location on the touch screen and being associated with a respective one of the two thumbs of the user.

The step of updating the key location of the unactivated virtual keys can be performed by considering two criteria. First, the updating step can be performed in view of the previously updated key locations of the virtual keys associated with the active fingers (see, e.g., FIG. 3 at step 106 and FIG. 4B). Second, the updating step can also be performed based on inter-key distance rules such as described below. As a result, the method 100 can dynamically calibrate the variable key locations of the virtual keys associated not only with the active fingers of a given typing event, but also with the inactive fingers.

Because the frequency of use of the different Braille keys is generally not the same, some of the keys may tend to be associated more often with active fingers and, in turn, to change location on the touch screen more frequently than the others, thus potentially affecting the overall configuration of the virtual Braille keyboard. Accordingly, updating the variable key locations of both the active and inactive fingers after each typing event may improve the effectiveness of the dynamic calibration method by helping the virtual Braille keyboard to retain a suitable configuration for a longer period of time before the user has or chooses to stop typing and go through a full recalibration procedure.

As mentioned above, the key locations of the unactivated virtual keys can be updated in view of the updated key locations of the activated virtual keys. The updating can involve adjusting the location of a number of unactivated keys to ensure that the overall arrangement of the activated and unactivated virtual keys obeys certain rules, referred to herein as "inter-key distance rules". Non-limiting examples of some of the inter-key distance rules that may be used when updating the location of the unactivated virtual keys will now be described.

In some embodiments, the inter-key distance rules can be based on an allowable range of inter-key distances between the variable key locations of adjacent virtual keys. This range of inter-key distances can include a minimum inter-key distance and a maximum inter-key distance to be maintained between the two keys of each pair of adjacent virtual keys. Depending on the implementation of the dynamic calibration method, the allowable range of inter-key distances may or may not be the same for each pair of adjacent virtual keys of the virtual Braille keyboard. In some cases, the pairs of adjacent virtual keys can consist only of fingers from a same hand, which in practice means that the unactivated virtual keys associated with the left and right hands are updated independently of each other.

The inter-key distance rules for a given typing event can be determined in view of the variable key locations of the virtual keys prior to the given typing event. In some scenarios, the inter-key distance rules can be established based on the configuration of the virtual Braille keyboard immediately following the last complete initialization or reinitialization of the virtual Braille keyboard performed by the user. In other scenarios, the inter-key distance rules can alternatively be established based on the configuration of the virtual Braille keyboard immediately prior to the given typing event, which means that the inter-key distance rules are to be updated after each typing event.

Figure 4C:
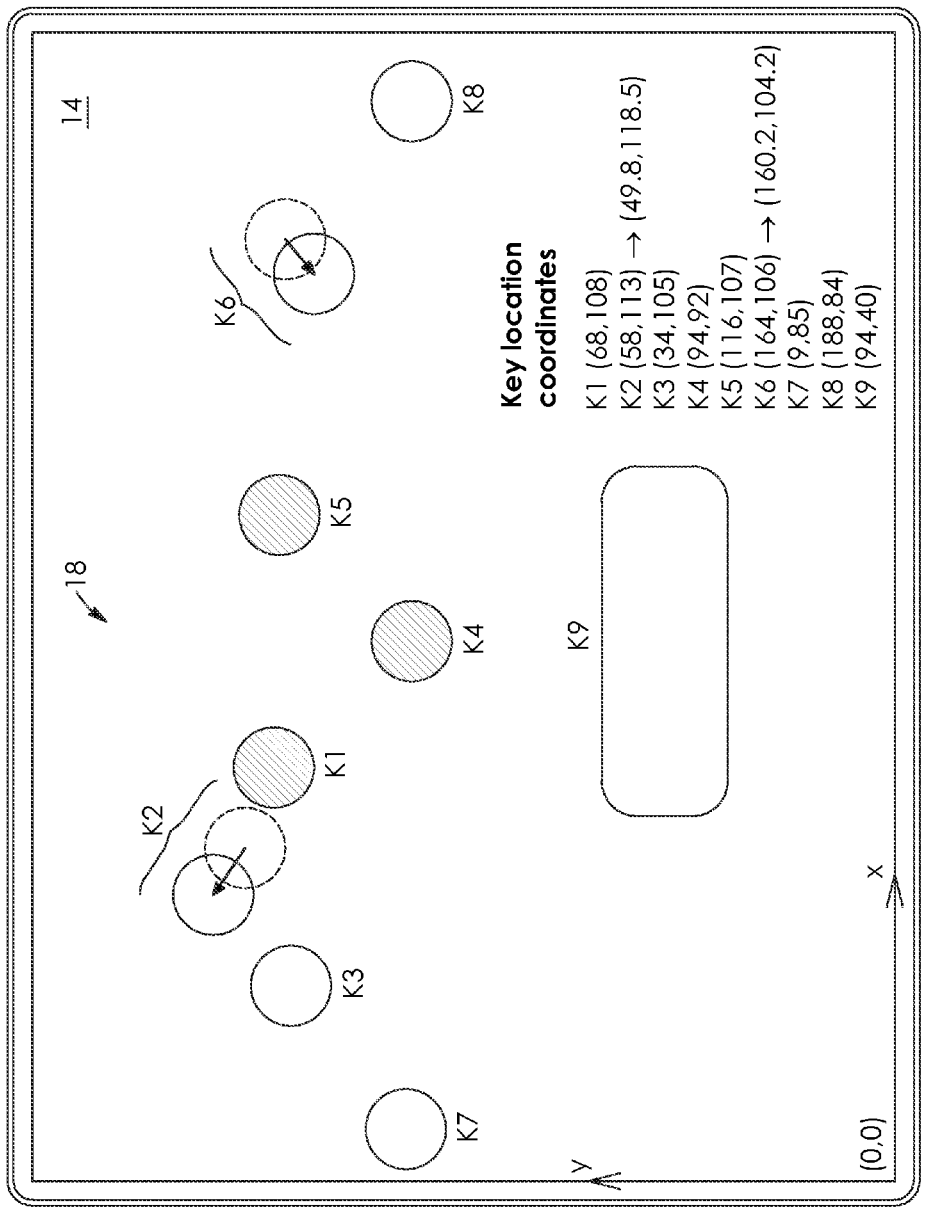
Figure 4D:
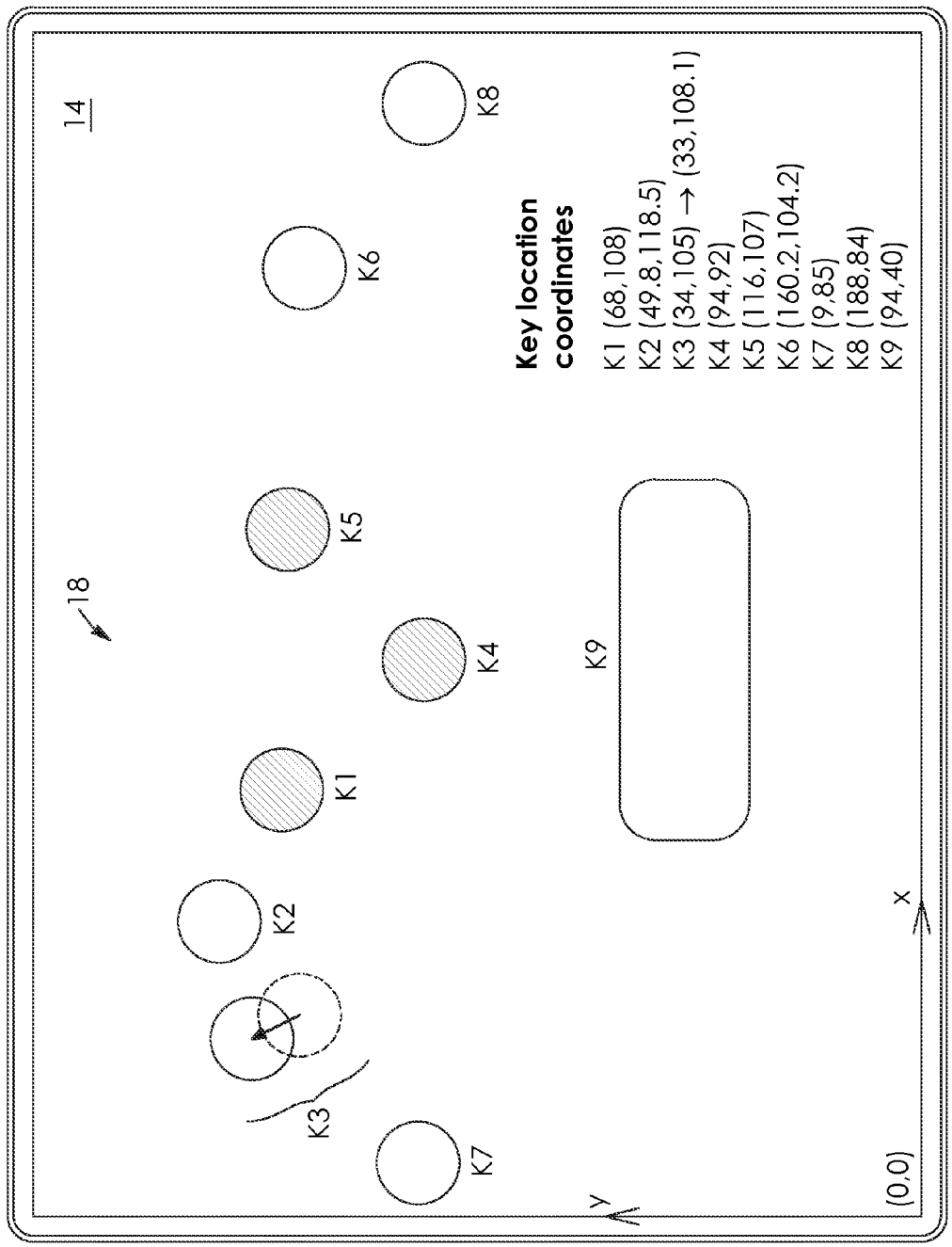

For example, in the diagrams of FIGS. 4A to 4E, the inter-key distance rules used in FIGS. 4C and 4D for updating the variable key locations of the unactivated virtual keys K2, K3 and K6 to K8 are established independently for each hand based on the inter-key distances between adjacent keys prior to the given typing event. This corresponds to the virtual Braille keyboard depicted in FIG. 4A, for which the following inter-key distances can be defined along the x and y axes:

$$\Delta x_{73} = 25 \quad \Delta y_{73} = 20 \quad \Delta x_{45} = 26 \quad \Delta y_{45} = 14$$
$$\Delta x_{32} = 24 \quad \Delta y_{32} = 8 \quad \Delta x_{56} = 34 \quad \Delta y_{56} = 4$$
$$\Delta x_{21} = 26 \quad \Delta y_{21} = 15 \quad \Delta x_{68} = 24 \quad \Delta y_{68} = 22, \quad (3)$$

The distance values of Equation (3) can be used to define an allowable range of inter-key distances between adjacent virtual keys, including a minimum inter-key distance and a maximum inter-key distance. For example, in the diagrams of FIGS. 4A to 4E, the minimum and maximum inter-key distances to be maintained between adjacent virtual key are respectively set as 70% and 130% of the distance values of Equation (3). Of course, different values and methods of defining the minimum and maximum inter-key distances can be used in other embodiments. It will also be understood that the minimum and maximum inter-key distances may, but need not, be defined in the same manner for each pair of adjacent virtual keys.

Once the location of the activated keys has been updated in response to the typing event (see FIG. 4B), the dynamic calibration method can include, for each of the unactivated keys, a step of assessing whether the inter-key distance between the unactivated key and each neighboring key is shorter or larger than the minimum and maximum inter-key distances, respectively. When it is found that one or more of the unactivated keys are too close to or too far from their respective neighboring keys, the dynamic calibration method can then include a step of updating the location of each unactivated virtual keys. The updating step can involve increasing to the minimum inter-key distance [e.g., to 70% of the distance values of Equation (3)] any inter-key distance that has been found to be too short, and decreasing to the maximum inter-key distance [e.g., to 130% of the distance values of Equation (3)] any inter-key distance that has been found to be too large.

In some embodiments, the successive of steps of assessing whether the unactivated keys have become too close to or too far from their neighboring keys after the key locations of the activated keys have been updated, and updating the location of the unactivated virtual keys in view of this assessment, can be performed first for the unactivated keys that are adjacent to at least one activated virtual key (e.g., virtual keys K2 and K6 in FIG. 4C) and then for the remainder of the unactivated keys (e.g., virtual keys K3, K7 and K8 in FIG. 4D).

Referring to FIG. 4C, following the displacement of the activated virtual key K1 from location coordinates (94, 98) in FIG. 4A to location coordinates (68, 108) in FIG. 4B, the x and y inter-key distances between the activated virtual key K1 and the unactivated virtual key K2 have changed to $\Delta x_{21}$=10 and $\Delta y_{21}$=5, which are 10/26=38% and 5/15=33% of the initial inter-key distances given in Equation (3). As the minimum inter-key distance between each pair of adjacent keys is set, in this example, to 70% of the corresponding initial inter-key distance, it is concluded that the virtual keys K1 and K2 have become too close to each other along both the x and y axes. In response, the x and y location coordinates of the unactivated virtual key K2 can be updated from (58, 113) to:

$$x_{2,updated} = x_{1,updated} - (0.7 \times \Delta x_{21,initial}) = 68 - (0.7 \times 26)$$
$$= 49.8; \text{ and}$$

$$y_{2,updated} = y_{1,updated} + (0.7 \times \Delta y_{21,initial}) = 108 + (0.7 \times 15)$$
$$= 118.5. \quad (4)$$

Referring still FIG. 4C, following the displacement of the activated virtual key K5 from location coordinates (130, 110) in FIG. 4A to location coordinates (116, 107) in FIG. 4B, the x and y inter-key distances between the activated virtual key K5 and the unactivated virtual key K6 have changed to $\Delta x_{56}$=48 and $\Delta y_{56}$=1, which are 48/34=141% and 1/4=25% of the initial inter-key distances given in Equation (3). As the minimum and maximum inter-key distance between each pair of adjacent keys is set, in this example, to respectively 70% and 130% of the corresponding initial inter-key distance, it is concluded that the virtual keys K5 and K6 have become too far from each other along the x axis and to close to each other along the y axis. In response, the x and y location coordinates of the unactivated virtual key K6 can be updated from (164, 106) to:

$$x_{6,updated} = x_{5,updated} + (1.3 \times \Delta x_{56,initial}) = 116 + (1.3 \times 34)$$
$$= 160.2; \text{ and}$$

$$y_{6,updated} = y_{5,updated} - (0.7 \times \Delta y_{56,initial}) = 107 - (0.7 \times 4)$$
$$= 104.2. \quad (5)$$

Referring to FIG. 4D, after the locations of the unactivated virtual keys K2 and K6 adjacent to the activated virtual keys K1, K4 and K5 have been updated, so too can the locations of the remaining unactivated virtual keys K3, K7 and K8, starting with any remaining unactivated virtual key adjacent to a previously updated unactivated key. In FIG. 4D, this means that the virtual key K7 is to be updated after and based on the updated position of the virtual key K3.

Following the displacement of the unactivated virtual key K2 from location coordinates (58, 113) in FIGS. 4A and 4B to location coordinates (49.8, 118.5) in FIG. 4C, the x and y inter-key distances between the unactivated virtual keys K2 and K3 have changed to $\Delta x_{32}=15.8$ and $\Delta y_{32}=13.5$, which are 15.8/24=66% and 13.5/8=169% of the initial inter-key distances given in Equation (3). As the minimum and maximum inter-key distance between each pair of adjacent keys is set, in this example, to respectively 70% and 130% of the corresponding initial inter-key distance, it is concluded that the virtual keys K2 and K3 have become too close to each other along the x axis and too far from each other along the y axis. In response, the x and y location coordinates of the unactivated virtual key K3 can be updated from (34, 105) to:

$$x_{3,updated} = x_{2,updated} - (0.7 \times \Delta x_{32,initial}) = 49.8 - (0.7 \times 24)$$
$$= 33; \text{ and}$$

$$y_{3,updated} = y_{2,updated} - (1.3 \times \Delta y_{32,initial}) = 118.5 - (1.3 \times 8)$$
$$= 108.1. \quad (6)$$

Following the displacement of the unactivated virtual key K3, the x and y inter-key distances between the unactivated virtual keys K3 and K7 have changed to $\Delta x_{73}=24$ and $\Delta y_{73}=23.1$, which are 24/25=96% and 23.1/20=116% of the initial inter-key distances given in Equation (3). These x and y inter-key distances remain within the allowable range of inter-key distances (i.e., between 70% and 130% of the initial inter-key distances) and the position of the unactivated virtual key K7 is not changed for the typing event illustrated in FIG. 4B.

Similarly, the displacement of the unactivated virtual key K6 from location coordinates (164, 106) in FIGS. 4A and 4B to location coordinates (160.2, 104.2) in FIG. 4C, the x and y inter-key distances between the unactivated virtual keys K6 and K8 have changed to $\Delta x_{68}=25.8$ and $\Delta y_{68}=21.2$, which are 25.8/24=108% and 21.2/22=96% of the initial inter-key distances given in Equation (3). These x and y inter-key distances remain within the allowable range of inter-key distances (i.e., between 70% and 130% of the initial inter-key distances) and the position of the unactivated virtual key K8 is not changed for the typing event illustrated in FIG. 4B.

Figure 4E:
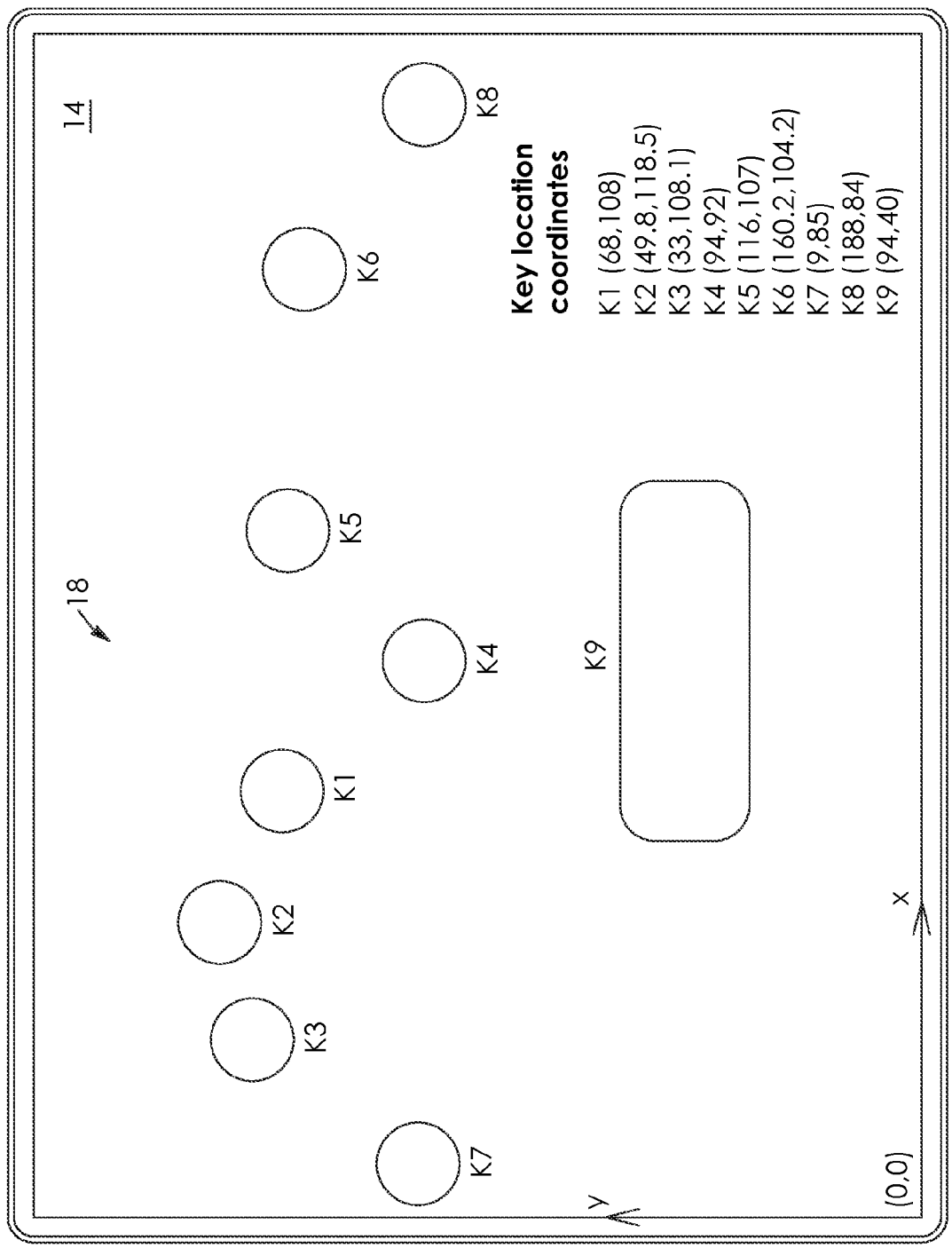

Finally, FIG. 4E illustrates the updated key locations of all the virtual keys of the virtual Braille keyboard 18 following the application of an embodiment of the dynamic calibration method and in response to the typing event illustrated in FIG. 4B and corresponding to the user typing the letter "d" on the virtual Braille keyboard 18. More specifically, the virtual keys K1 to K9 in FIG. 4E are now centered on the following x-y key location coordinates:

$$K1(68, 108) \quad K4(94, 92) \quad K7(9, 85) \quad (7)$$
$$K2(49.8, 118.5) \quad K5(116, 107) \quad K8(188, 84)$$
$$K3(33, 108.1) \quad K6(160.2, 104.2) \quad K9(94, 40).$$

It is to be noted that in the exemplary diagrams of FIGS. 4A to 4E, the key location of each of the unactivated virtual keys K2, K3 and K6 to K8 is updated along both the x and y axes. However, in other embodiments, the update can be made, for example, along only one of the two axes, or along lines separating the centers of adjacent virtual keys without departing from the scope of the invention. In further embodiments, the key locations of different unactivated virtual keys can be updated according to different schemes.

In addition, in some embodiments, it may be sufficient to update the key locations of the unactivated virtual keys only along the x axis, since the risk of overlap and confusion between two adjacent virtual keys of a virtual Braille keyboard is generally more important along the x axis (i.e., the axis along which the virtual keys are more or less aligned) than along the y axis. In other words, when typing Braille on a virtual keyboard, it is often found that finger drifts along the x axis are generally more detrimental than along the y axis, and thus may potentially benefit more from the dynamic calibration method described herein.

Reinitialization of a Calibration of a Virtual Braille Keyboard

In accordance with another aspect, there is provided a computer-implemented method for reinitializing a calibration of a virtual Braille keyboard for a single one of the two hands of a user. The virtual Braille keyboard is implemented on a touch screen and includes a plurality of virtual keys each associated with a corresponding one of the fingers of the user and with a key location on the touch screen.

An embodiment of the calibration reinitialization method 200 will be described with reference to the flow chart of FIG. 5, in conjunction with the diagrams of FIGS. 6A to 6E. The diagrams of FIGS. 6A to 6E are schematic top plan views of a Braille device 10 including a touch screen 14 implementing a virtual Braille keyboard 18, and a refreshable Braille display 16 located below the touch screen 14, illustrating different steps of an embodiment of the calibration reinitialization method. The calibration reinitialization method can, by way of example, be performed with a portable Braille device like that described above with reference to FIGS. 1 and 2, or on any other suitable device provided with a touchscreen controlled by modules performing the appropriate functions.

Figure 6A:
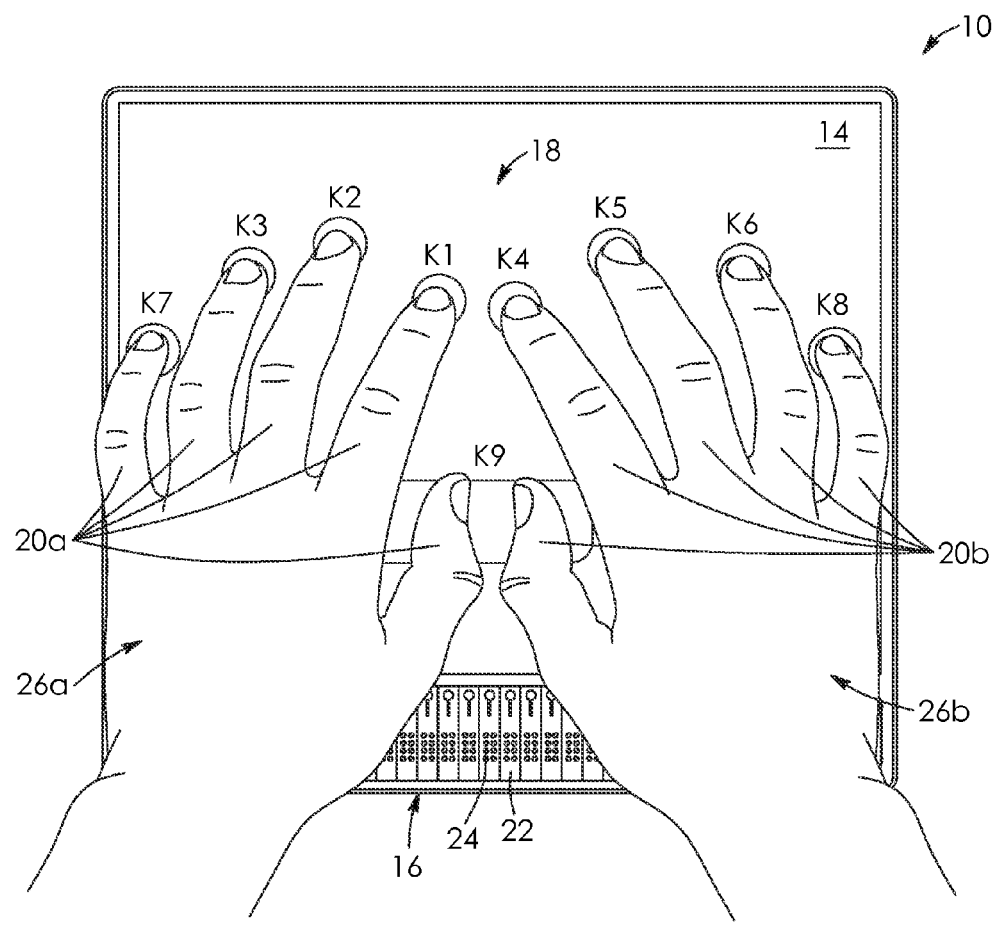
FIGS. 6A to 6E are schematic top plan views of a portable Braille device including a touch screen implementing a virtual Braille keyboard, and a refreshable Braille display located below the touch screen, illustrating different steps of an embodiment of the calibration reinitialization method.
Figure 6B:
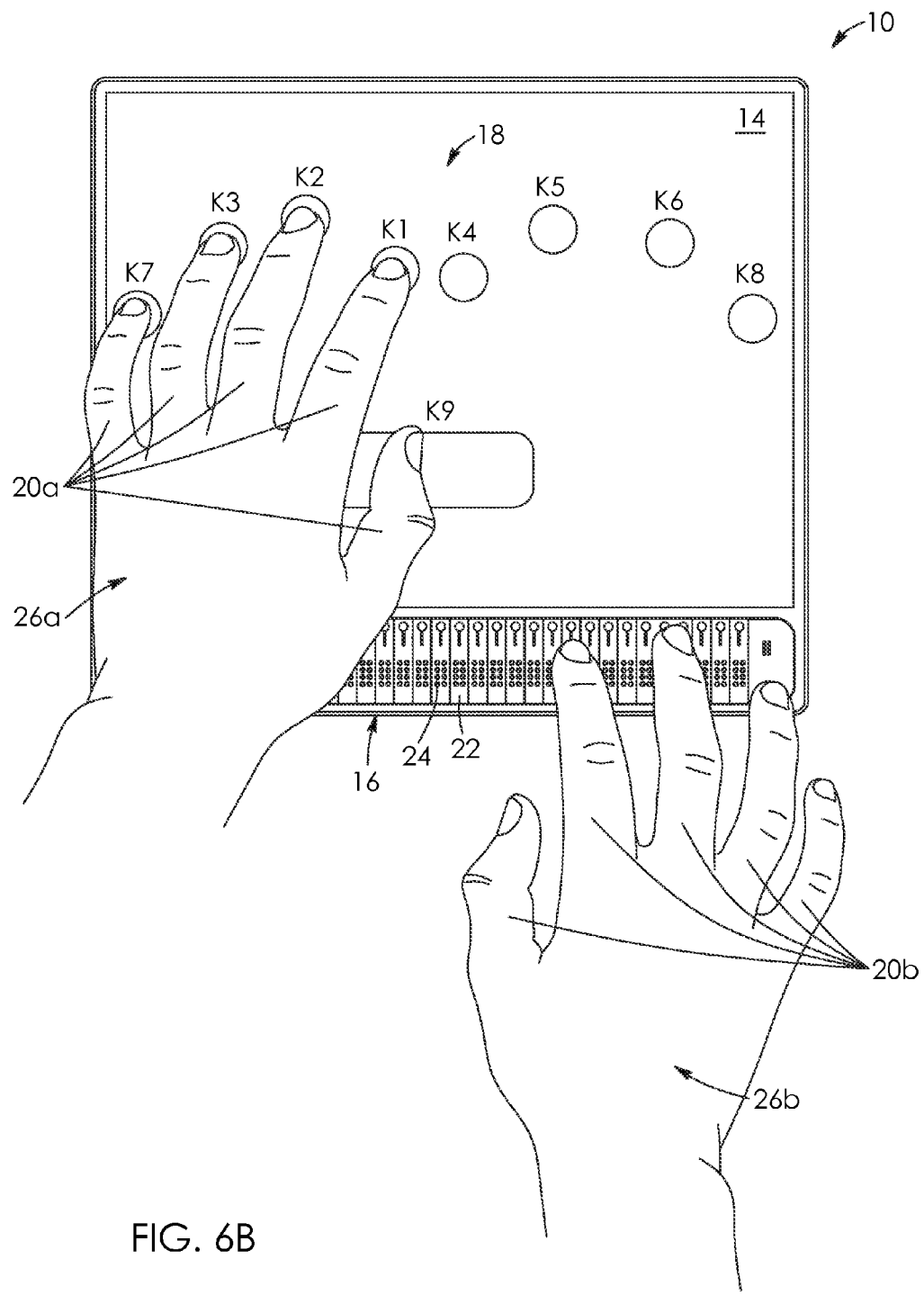

Referring to FIGS. 6A and 6B, there is illustrated a Braille device 10 including a virtual Braille keyboard 18 implemented on a touch screen 14. The Braille device 10 enables or is disposed proximate to another device enabling tactile Braille reading, which, in the illustrated embodiment, is a refreshable Braille display 16 implemented as a linear array of electromechanically actuated Braille cells 22. In such an embodiment, a user will typically switch back and forth between typing text on the virtual Braille keyboard 18 and reading the refreshable Braille display 16 to review text that has been typed. In a typical typing session, the user will generally enter text on the virtual Braille keyboard 18 using the fingers 20a of both hands 26a, 26b, as illustrated in FIG. 6A. However, as illustrated in FIG. 6B, the user will often read text on the refreshable Braille display 16 using the fingers 20b of only one hand 26b, especially when reading for the purpose of briefly reviewing text entered on the virtual Braille keyboard.

In this scenario, when the user momentarily stops typing for reading on the refreshable Braille display 16 using his or her "reading" hand 26b, the "resting" hand 26a will generally remain in a typing position with the fingers 20a more or less aligned with their associated virtual keys K1 to K3 and K7. Upon switching back to typing, the reading hand 26b will aim to return toward the virtual keyboard 18 with the fingers 20b properly positioned relative to their associated virtual keys K4 to K6 and K8. However, due to the fact that: (i) the user may often be blind or visually impaired; (ii) there are generally no tactile references on the touch screen 14 for assessing or detecting the location of the keys on the virtual Braille keyboard 18; and/or (iii) the virtual Braille keyboard 18 is often, in any event, not visually displayed on the touch screen 14, the fingers 20b of the reading hand 26b will generally not return sufficiently close to where they were initially. Of course, although in the illustrated embodiment the reading hand has been associated with the right hand of the user and the resting hand with the left hand, the opposite could be applied without departing from the scope of the invention.

As a result, the user often has to go through a complete recalibration of the virtual Braille keyboard 18 every time the refreshable Braille display 16 is read, even if only one hand 26b is used for reading while the other hand 26a remains in a typing position with its fingers 20a aligned with their associated virtual keys K1 to K3 and K7. As will now be described, in order to address or mitigate this issue, some embodiments provide a method for reinitializing the calibration of a virtual Braille keyboard for only a single hand of the user. For simplicity, the hand whose calibration is reinitialized according to this method is referred to herein as the "reading hand".

Figure 5:
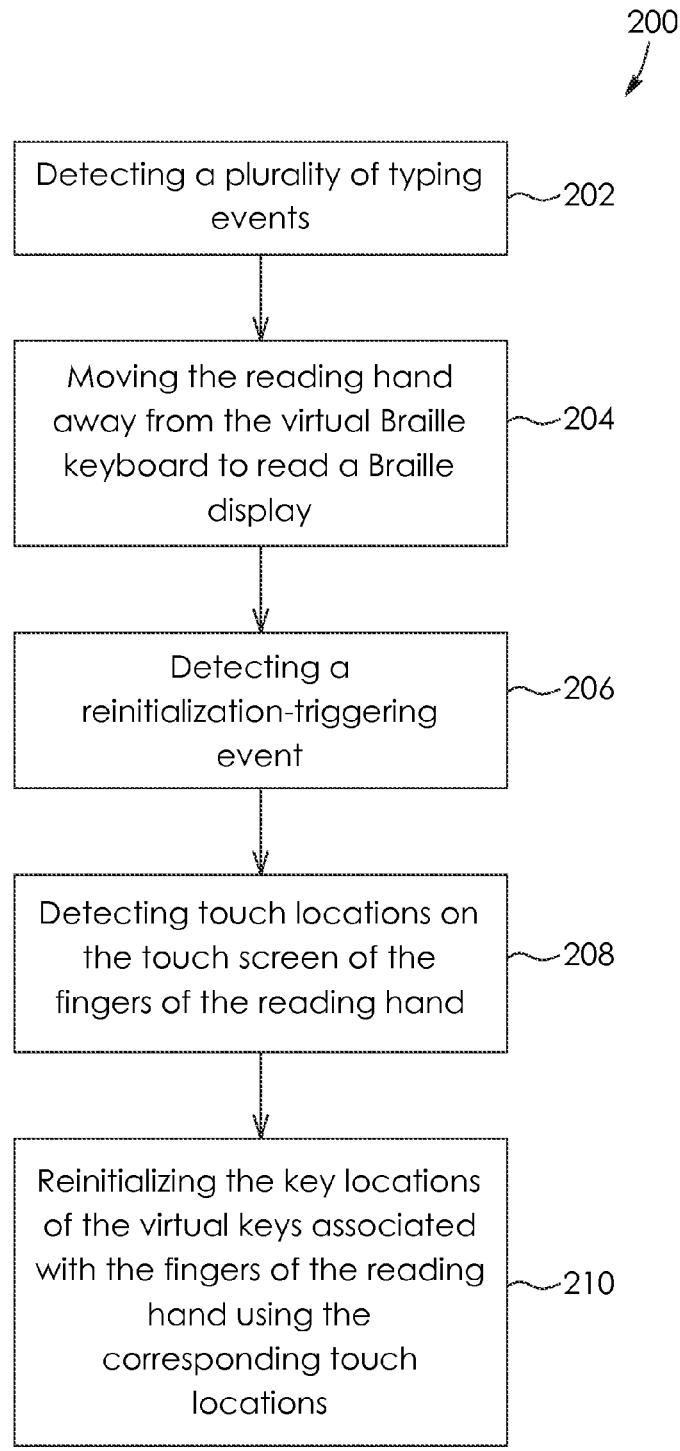
FIG. 5 is flow chart of a method for reinitializing a calibration of a virtual Braille keyboard for one hand of a user, in accordance with an embodiment.

Referring to FIG. 5, the method 200 first includes a step of detecting 202 a plurality of typing events, each typing events involving one or more of the fingers of the user contacting the touch screen at corresponding ones of the key locations. Each typing input can be detected when the contact with the touch screen at the corresponding touch locations is either initiated or terminated by the user.

Each typing event generally corresponds to the entry of one Braille character on the virtual Braille keyboard through the coordinated activation of one or more virtual keys by the one or more fingers associated therewith. As previously mentioned, a Braille character can include, without limitation, letters, numbers, punctuations, symbols, indicators, Braille composition signs, and the like. Depending on the implementation of the method 200, the plurality of typing events detected at this step 202 may correspond to a word, an expression, a sentence, a paragraph, a text, and so on. In FIG. 6A, the Braille characters typed on the virtual Braille keyboard 18 can be read by the user on the refreshable Braille display 16.

Referring to both FIGS. 5 and 6B, the method 200 can include a step of moving 204 the reading hand 26b away from the virtual Braille keyboard 18 to read the refreshable Braille display 16 operatively connected to the virtual Braille keyboard 18. In FIG. 6B, the refreshable Braille display 16 is implemented as a linear array of thirty-two electromechanically actuated Braille cells 22 located below the touch screen 14, but other types and configurations for the Braille display could be envisioned in other embodiments. Additionally, while in FIG. 6A, the touch screen 14 implementing the virtual Braille keyboard 18 and the Braille display 16 are components of a single-unit portable Braille device 10, this need not be the case in other embodiments. For example, in some embodiments, the touch screen implementing the virtual Braille keyboard and Braille display could be provided as two physically distinct devices operatively connectable to each other for the purpose of defining a Braille system.

When the reading hand 26b is moved toward the refreshable Braille display 16 for reading previously entered text, the virtual Braille keyboard 18 in FIG. 6B is characterized by a certain calibration, referred to as its "current calibration". For simplicity, the current calibration in FIG. 6B is assumed to be the same as the initial calibration given by Equation (1) and illustrated in FIG. 4A.

Figure 6C:
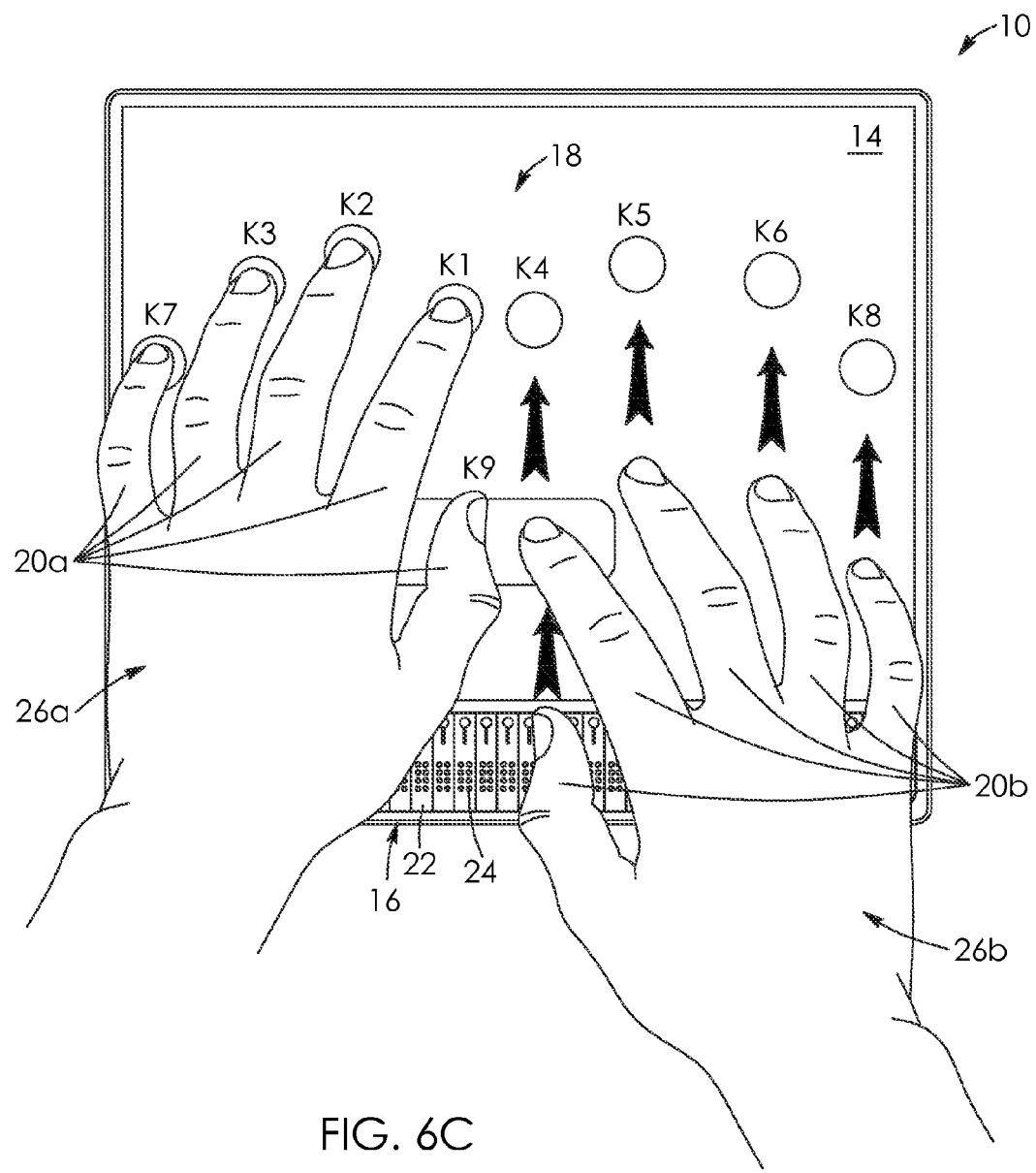

Referring to FIGS. 5 and 6C, the method also includes a step of detecting 206 a reinitialization-triggering event performed by one or more of the fingers 20b of the reading hand 26b. As used herein, the term "reinitialization-triggering event" is intended to refer to any action or series of actions that can be performed by the fingers 20b of the reading hand 26b, and be detected and interpreted as a request to reset the current key locations of the virtual keys K4 to K6 and K8 associated with the reading hand 26b. Non-limiting examples for the recalibration-triggering event can include tactile inputs performed on the touch screen 14 or another touch sensitive surface, such as, for example, a single tapping motion, a multiple tapping motion, a sliding motion, a pressing-and-hold motion, a press-and-release motion, a swiping motion, and a pinching motion, but also the actuation of a control button, a switch or the like. Those skilled in the art will understand that the terminology "reinitialization-triggering event" is not intended to be limiting.

For example, in FIG. 6C, in some embodiments the reinitialization-triggering event includes a sliding gesture action of the fingers 20b of the reading hand 26b sliding on the touch screen 14 toward corresponding touch locations in order to resuming typing on the virtual Braille keyboard 18. The sliding gesture action of the fingers of the fingers 20b of the reading hand 26b is depicted by solid arrows in FIG. 6C.

Figure 6D:
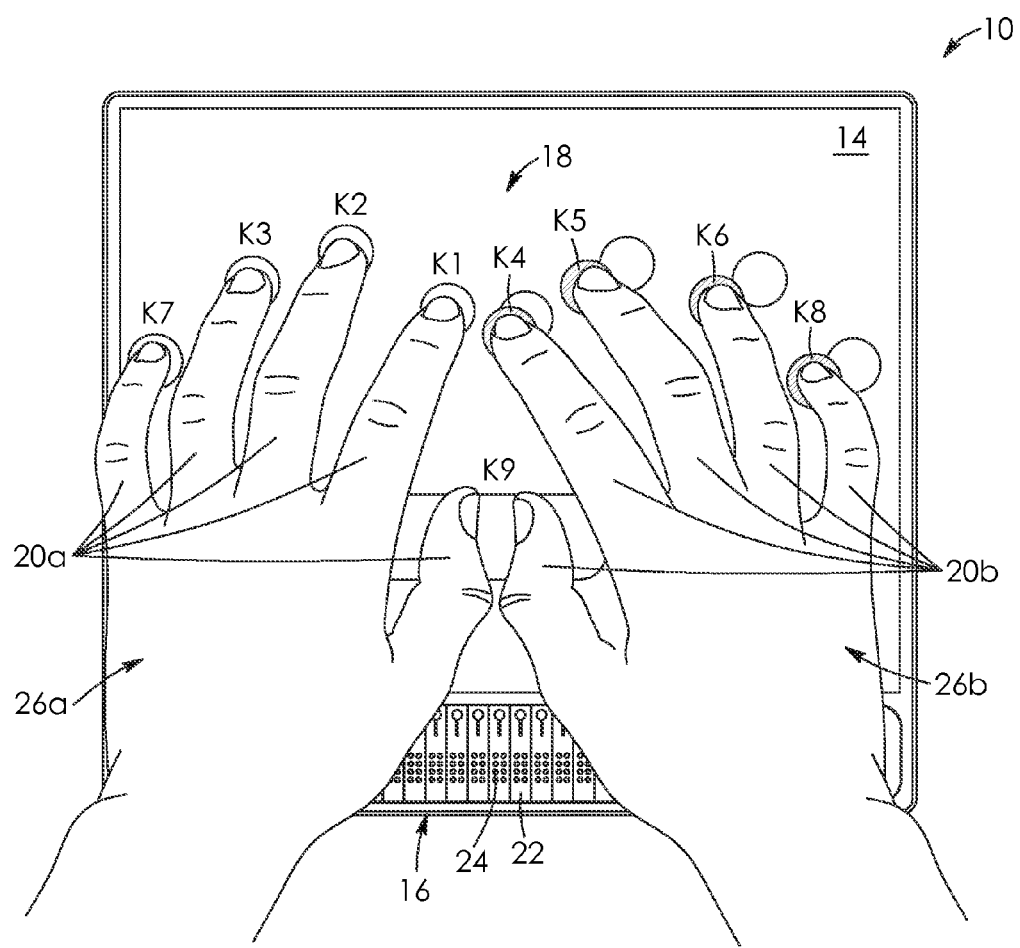

Referring now to FIGS. 5 and 6D, the method 200 further includes a step of detecting 208 touch locations on the touch screen 14 of the fingers 20b of the reading hand 26b. These touch locations correspond to the locations of the fingers 20b of the reading hand 26b at the end of the sliding gesture (see FIG. 6C) and are indicated by hashed circular dots centered on the touch locations. In FIG. 6D, touch locations of the fingers 20b of the reading hand 26b have the following x-y touch location coordinates:

$$\text{Index finger } (95, 90) \quad \text{Ring finger } (153, 100) \quad (8)$$
$$\text{Middle finger } (120, 104) \quad \text{Little finger } (178, 80)$$

Figure 6E:
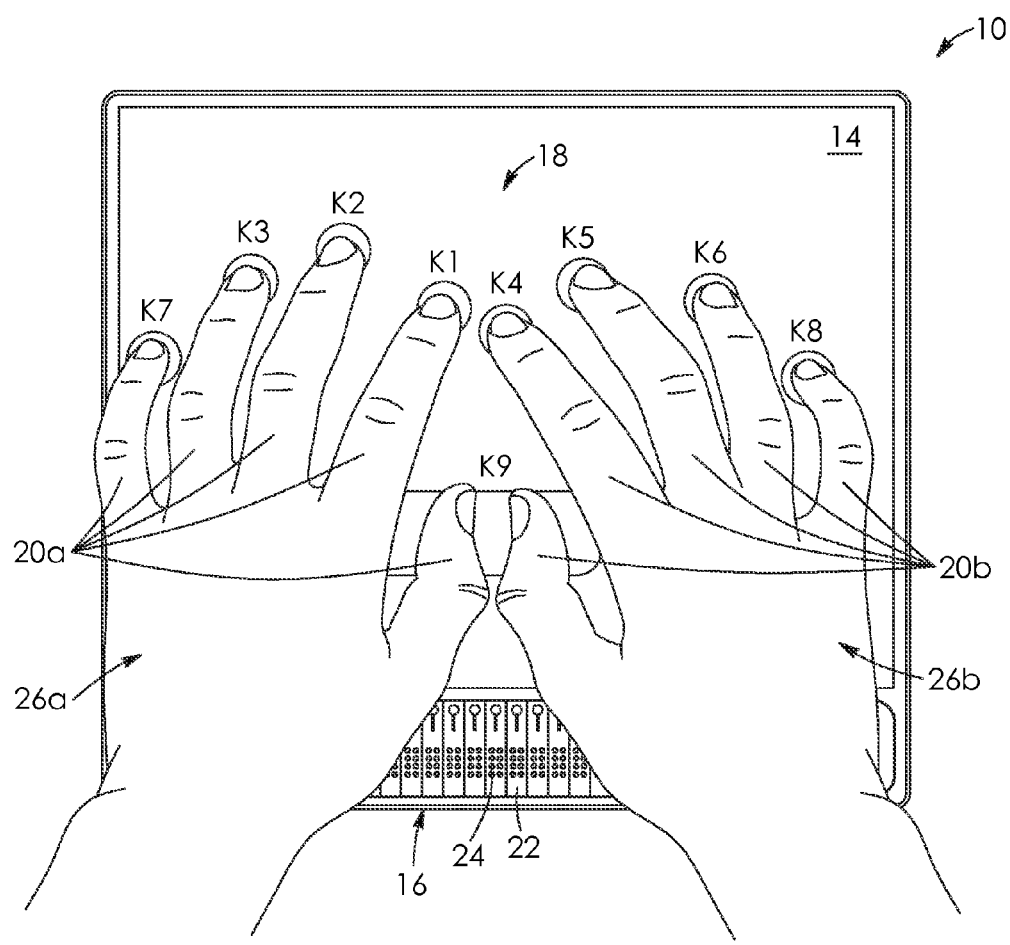

Referring to FIGS. 5 and 6E, the method 200 also includes a step 210 of reinitializing the key locations of the virtual keys K4 to K6 and K8 associated with the fingers 20b of the reading hand 26b using the corresponding touch locations detected at step 208, while retaining or keeping unchanged the key locations of the virtual keys K1 to K3 and K7 associated with the fingers 20a of the resting hand 26a. The reinitialization step 210 can include associating each of the touch locations of Equation (8) to the one of the virtual keys K1 to K3 and K7 whose key location prior to the reinitialization-triggering event is the closest. Accordingly, the touch locations (95, 90), (120, 104), (153, 100), and (178, 80) of the four fingers 20b of the reading hand 26b can be respectively associated with the virtual keys K4 to K6 and K8.

Following the reinitialization of the virtual keys K4 to K6 and K8 associated with the fingers 20b of the reading hand 26b, the virtual keys K1 to K9 in FIG. 6E are now centered on the following x-y key location coordinates:

$$K1(68, 108) \quad K4(95, 90) \quad K7(9, 85) \quad (9)$$
$$K2(49.8, 118.5) \quad K5(120, 104) \quad K8(178, 80)$$
$$K3(33, 108.1) \quad K6(153, 100) \quad K9(94, 40).$$

It is noted that for the same reasons as above, the treatment of the spacebar virtual key K9 has been omitted in the embodiment illustrated in the diagrams of FIGS. 6A to 6E.

It should also be noted that while the embodiment of the calibration reinitialization method 200 illustrated in FIGS. 5 to 6E have been described as involving a reading hand moving away from the virtual Braille keyboard between the detection of the typing events (step 202) and the detection of the reinitialization-triggering event (step 206) to read Braille on a Braille display, this need not be the case in other embodiments. In other words, the method for reinitializing a calibration of a virtual Braille keyboard for only one hand of a user can be performed irrespectively of whether the hand whose associated virtual keys are to be reinitialized has been used to read Braille prior to the reinitialization.

Of course, numerous modifications could be made to the embodiments described above without departing from the scope of the present invention.

The invention claimed is:

1. A computer-implemented method for dynamically calibrating a virtual Braille keyboard implemented on a touch screen, the virtual Braille keyboard comprising a plurality of virtual keys, each virtual key being assigned one-to-one to a corresponding one of the fingers of a user and having a variable key location on the touch screen, the method comprising the steps of:
   (a) detecting a plurality of typing events, each typing event corresponding to a Braille character entry on the virtual Braille keyboard and involving (i) one or more of the fingers of the user contacting the touch screen at corresponding touch locations and defining one or more active fingers for said typing event, and (ii) the remainder of the fingers of the user not contacting the touch screen and defining one or more inactive fingers for said typing event;
   (b) updating, individually and in real-time, the variable key location on the virtual Braille keyboard of the virtual key assigned to each active finger in view of the corresponding touch location of each active finger detected during a current one of said typing events; and
   (c) updating, individually and in real-time, the variable key location on the virtual Braille keyboard of the virtual key assigned to each inactive finger for the current typing event based on inter-key distance rules and in view of the one or more variable key locations updated in step (b), said updating in step (c) comprising, for each inactive finger: assessing whether the virtual key assigned to the inactive finger remains within a range of allowable inter-key distances from an adjacent one of the plurality of virtual keys of the virtual Braille keyboard; and, if not, changing the variable key location on the virtual Braille keyboard of the virtual key assigned to each inactive finger to be within said range of allowable inter-key distances from said adjacent virtual key.

2. The computer-implemented method according to claim 1, further comprising, upon detecting each typing event:
   assigning each active finger to the virtual key whose variable key location on the virtual Braille keyboard prior to said typing event is closest to the touch location of the active finger.

3. The computer-implemented method according to claim 1, wherein the variable key location of each virtual key on the virtual Braille keyboard is identified by location coordinates x and y with respect to an x-y coordinate system associated with the touch screen and including an x axis and a y axis orthogonal to each other and respectively parallel to a width and a height of the touch screen, and wherein said inter-key distance rules are defined based on a selected one of said x and y axes.

4. The computer-implemented method according to claim 3, wherein the selected axis is the x axis.

5. The computer-implemented method according to claim 1, wherein the inter-key distance rules corresponding to each typing event are determined in view of the variable key locations of the virtual keys on the virtual Braille keyboard prior to said typing event.

6. The computer-implemented method according to claim 1, wherein the adjacent virtual keys are assigned to fingers of a same hand of the user.

7. The computer-implemented method according to claim 1, wherein each allowable range of inter-key distances comprises a minimum inter-key distance and a maximum inter-key distance.

8. The computer-implemented method according to claim 7, wherein step c) comprises, for each inactive finger, at least one of:
   assessing whether a distance between the virtual key assigned to the inactive finger and an adjacent virtual key is shorter than the minimum inter-key distance and, if so, updating the variable key location on the virtual Braille keyboard of the virtual key assigned to the inactive finger such that said distance becomes equal to the minimum inter-key distance; and
   assessing whether a distance between the virtual key assigned to the inactive finger and an adjacent virtual key is larger than the maximum inter-key distance and, if so, updating the variable key location on the virtual Braille keyboard of the virtual key assigned to the inactive finger such that said distance becomes equal to the maximum inter-key distance.

9. The computer-implemented method according to claim 1, wherein the inter-key distance rules are the same for each pair of adjacent virtual keys of the virtual Braille keyboard.

10. The computer-implemented method according to claim 1, wherein step c) is performed first for the one or more virtual keys assigned to an inactive finger that are adjacent to at least one virtual key assigned to an active finger.

11. The computer-implemented method according to claim 1, wherein, for the current typing event, the one or more active fingers consist of a plurality of active fingers of a same hand of the user.

12. The computer-implemented method according to claim 1, wherein each typing event is initiated by one of a plurality of touch gesture actions being performed by the one or more active fingers.

13. The computer-implemented method according to claim 12, wherein the plurality of touch gesture actions comprises a tapping motion and a press-and-release motion.

14. A computer readable memory storing computer executable instructions thereon that when executed by a computer perform the method steps of claim 1.

15. A Braille device comprising:
   a housing;
   a touch screen disposed on the housing and having a virtual Braille keyboard implemented thereon and configured for entry of input Braille data from a user, the virtual Braille keyboard comprising a plurality of virtual keys each assigned one-to-one to a corresponding one of the fingers of the user and having a variable key location on the touch screen; and a processor for dynamically calibrating the virtual Braille keyboard while receiving the input Braille data from the user, the processor being configured to:
 detect a plurality of typing events, each typing event corresponding to a Braille character entry on the virtual Braille keyboard and involving (i) one or more of the fingers of the user contacting the touch screen at corresponding touch locations and defining one or more active fingers for said typing event, and (ii) the remainder of the fingers of the user not contacting the touch screen and defining to one or more inactive fingers for said typing event;
 update, individually and in real-time, the variable key location on the virtual Braille keyboard of the virtual key assigned to each active finger in view of the corresponding touch location of each active finger detected during a current one of said typing events; and
 update, individually and in real-time, the variable key location on the virtual Braille keyboard of the virtual key assigned to each inactive finger for the current typing event based on inter-key distance rules and in view of the one or more updated variable key locations of the virtual key assigned to each active finger, said updating comprising, for each inactive finger: assessing whether the virtual key assigned to the inactive finger remains within a range of allowable inter-key distances from an adjacent one of the plurality of virtual keys of the virtual Braille keyboard; and, if not, changing the variable key location on the virtual Braille keyboard of the virtual key assigned to each inactive finger to be within said range of allowable inter-key distances from said adjacent virtual key.

* * * * *